(12) United States Patent
Zupancich et al.

(10) Patent No.: US 7,587,984 B2
(45) Date of Patent: Sep. 15, 2009

(54) INSULATED CARGO CONTAINERS

(75) Inventors: Ronald J. Zupancich, Clayton, NC (US); Joseph A. Seiter, Raleigh, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 732 days.

(21) Appl. No.: 11/150,310

(22) Filed: Jun. 13, 2005

(65) Prior Publication Data

US 2005/0252164 A1 Nov. 17, 2005

Related U.S. Application Data

(63) Continuation-in-part of application No. 11/072,293, filed on Mar. 7, 2005.

(60) Provisional application No. 60/549,929, filed on Mar. 5, 2004.

(51) Int. Cl.
*B61D 25/00* (2006.01)
(52) U.S. Cl. .................... 105/404; 105/396; 105/355
(58) Field of Classification Search ................ 220/1.5, 220/592.25, 592.2, 592.26; 105/423, 355, 105/404, 409
See application file for complete search history.

(56) References Cited

U.S. PATENT DOCUMENTS

| | | | |
|---|---|---|---|
| 739,800 A | 9/1903 | Adams | |
| 905,000 A | 11/1908 | Roberts | |
| 1,127,451 A | 2/1915 | Knoch | |
| 1,269,663 A | 6/1918 | Wappler | |
| 3,175,520 A | * | 3/1965 | Talmey ........... 105/404 |
| 3,711,148 A | 1/1973 | Hindin | |
| 3,715,846 A | 2/1973 | Sullhofer | |
| 3,739,526 A | 6/1973 | Nelson | |
| 3,797,190 A | 3/1974 | Widdowson | |
| 3,802,591 A | 4/1974 | Mizushima et al. | |
| 3,880,415 A | 4/1975 | Fujioka et al. | |
| 3,962,015 A | 6/1976 | Heimann | |

(Continued)

FOREIGN PATENT DOCUMENTS

EP 0 006 443 A1 9/1980

(Continued)

OTHER PUBLICATIONS

"Qualification Testing of Portland's Low Floor Light Rail Vehicle", Porter, D.L. et al., Proceedings of the 1997 IEEE/ASME Joint Railroad Conference, p. 221-35 (1997).

(Continued)

*Primary Examiner*—S. Joseph Morano
*Assistant Examiner*—Jason C Smith
(74) *Attorney, Agent, or Firm*—Finnegan, Henderson, Farabow, Garrett & Dunner L.L.P.

(57) ABSTRACT

A method of insulating an existing cargo container, such as a boxcar. The method allows for the application of improved insulation materials to improve the R-Value of an existing boxcar without building a new boxcar. In one implementation, the method includes preparing multiple insulating panels comprising an insulating layer and an outer skin located on at least one face of the insulating layer and attaching the insulating panels on an exterior surface of the side walls, end walls, and roof of the boxcar. The method also includes installing closures on uncovered areas of the boxcar and applying foam insulation to the bottom surface of the boxcar.

19 Claims, 33 Drawing Sheets

U.S. PATENT DOCUMENTS

| | | | |
|---|---|---|---|
| 3,974,781 A | 8/1976 | Josephson | |
| 3,993,811 A | 11/1976 | Walles | |
| 4,049,311 A | 9/1977 | Dietrich et al. | |
| 4,078,395 A | 3/1978 | Crowe et al. | |
| 4,091,743 A | 5/1978 | Lemon | |
| 4,151,802 A | 5/1979 | Miller et al. | |
| 4,221,421 A | 9/1980 | Bettker, Jr. et al. | |
| 4,239,008 A | 12/1980 | Conlon | |
| 4,263,751 A * | 4/1981 | Bennett et al. | 49/501 |
| 4,296,692 A | 10/1981 | Roux | |
| 4,302,913 A | 12/1981 | Schwartz et al. | |
| 4,310,192 A | 1/1982 | Fitzgerald | |
| 4,344,299 A | 8/1982 | Latzer | |
| 4,357,048 A | 11/1982 | Zehnder et al. | |
| 4,406,131 A | 9/1983 | Weasel, Jr. | |
| 4,434,623 A | 3/1984 | Weasel, Jr. | |
| 4,448,041 A | 5/1984 | Southworth, Jr. | |
| 4,454,723 A | 6/1984 | Weasel, Jr. | |
| 4,455,806 A | 6/1984 | Rice | |
| 4,498,418 A | 2/1985 | Chumley | |
| 4,569,292 A | 2/1986 | Dunham et al. | |
| 4,570,396 A | 2/1986 | Struben | |
| 4,631,891 A | 12/1986 | Donavich | |
| 4,646,934 A | 3/1987 | McAllister | |
| 4,682,458 A | 7/1987 | Sparrow | |
| 4,704,876 A | 11/1987 | Hill | |
| 4,763,452 A | 8/1988 | Harvey | |
| 4,778,078 A | 10/1988 | McAllister | |
| 4,791,768 A | 12/1988 | Crean | |
| 4,884,496 A | 12/1989 | Donavich | |
| 4,887,437 A | 12/1989 | Fenton et al. | |
| 4,891,954 A | 1/1990 | Thomsen | |
| 4,918,895 A | 4/1990 | Landheer | |
| 4,958,472 A | 9/1990 | Ehrlich | |
| 5,010,943 A | 4/1991 | Boyer | |
| 5,011,729 A | 4/1991 | McAllister | |
| 5,016,395 A | 5/1991 | Walker et al. | |
| 5,016,408 A | 5/1991 | Brillinger et al. | |
| 5,054,402 A | 10/1991 | Brassell | |
| 5,054,843 A | 10/1991 | Gray | |
| 5,168,717 A | 12/1992 | Mowatt-Larssen | |
| 5,170,605 A | 12/1992 | Huddle | |
| 5,285,604 A | 2/1994 | Carlin | |
| 5,316,171 A | 5/1994 | Danner, Jr. et al. | |
| 5,330,816 A | 7/1994 | Rusek, Jr. | |
| 5,351,990 A | 10/1994 | Thomas | |
| 5,403,063 A | 4/1995 | Sjostedt et al. | |
| 5,473,901 A | 12/1995 | Roseen | |
| 5,500,305 A * | 3/1996 | Bridges et al. | 428/621 |
| 5,507,405 A * | 4/1996 | Thomas et al. | 220/1.5 |
| 5,512,345 A | 4/1996 | Tsutsumi et al. | |
| 5,584,188 A | 12/1996 | Tippmann et al. | |
| 5,660,057 A | 8/1997 | Tyree, Jr. | |
| 5,664,396 A | 9/1997 | Lyman et al. | |
| 5,671,609 A | 9/1997 | Lionetti | |
| 5,711,073 A | 1/1998 | Tippmann et al. | |
| 5,741,042 A * | 4/1998 | Livingston et al. | 296/203.01 |
| 5,756,179 A * | 5/1998 | Jutte | 428/69 |
| 5,765,485 A | 6/1998 | Thoman et al. | |
| 5,772,276 A | 6/1998 | Fetz et al. | |
| 5,784,970 A | 7/1998 | Fehr et al. | |
| 5,795,639 A | 8/1998 | Lin | |
| 5,797,646 A | 8/1998 | Jeunehomme et al. | |
| 5,802,984 A | 9/1998 | Thoman et al. | |
| 5,855,174 A | 1/1999 | Thoman et al. | |
| 5,857,414 A | 1/1999 | Thoman et al. | |
| 5,890,435 A * | 4/1999 | Thoman et al. | 105/404 |
| 5,900,299 A | 5/1999 | Wynne | |
| 5,916,093 A | 6/1999 | Fecko et al. | |
| 5,927,090 A | 7/1999 | Ladendorf et al. | |
| 5,934,741 A | 8/1999 | Beukers et al. | |
| 5,938,274 A | 8/1999 | Ehrlich | |
| 5,947,812 A | 9/1999 | Henning et al. | |
| 5,979,173 A | 11/1999 | Tyree | |
| 5,979,684 A | 11/1999 | Ohnishi et al. | |
| 5,988,074 A | 11/1999 | Thoman | |
| 5,992,117 A | 11/1999 | Schmidt | |
| 6,000,342 A | 12/1999 | Thoman et al. | |
| 6,010,020 A | 1/2000 | Abal | |
| 6,037,033 A | 3/2000 | Hunter | |
| 6,092,472 A | 7/2000 | Thoman et al. | |
| 6,119,422 A | 9/2000 | Clear et al. | |
| 6,132,307 A | 10/2000 | Wills | |
| 6,138,580 A | 10/2000 | Thoman | |
| 6,164,085 A | 12/2000 | Clarke et al. | |
| 6,199,939 B1 | 3/2001 | Ehrlich | |
| 6,220,651 B1 | 4/2001 | Ehrlich | |
| 6,224,142 B1 | 5/2001 | McCormack | |
| 6,244,458 B1 | 6/2001 | Frysinger et al. | |
| 6,266,972 B1 | 7/2001 | Bostic | |
| 6,269,652 B1 | 8/2001 | Grosskopf | |
| 6,349,988 B1 * | 2/2002 | Foster et al. | 296/181.6 |
| 6,367,391 B1 | 4/2002 | Thoman et al. | |
| 6,374,546 B1 | 4/2002 | Fecko et al. | |
| 6,381,966 B1 | 5/2002 | Barrow | |
| 6,381,981 B1 | 5/2002 | Yaddgo et al. | |
| 6,397,620 B1 | 6/2002 | Kelly et al. | |
| 6,454,345 B1 | 9/2002 | Campus | |
| 6,503,037 B2 | 1/2003 | Thomson et al. | |
| 6,505,883 B1 | 1/2003 | Ehrlich | |
| 6,550,255 B2 | 4/2003 | Rudick et al. | |
| 6,615,741 B2 | 9/2003 | Fecko et al. | |
| 6,623,413 B1 | 9/2003 | Wynne | |
| 6,722,287 B2 | 4/2004 | Norton et al. | |
| 6,892,433 B2 * | 5/2005 | Barry et al. | 29/469 |
| 6,904,848 B2 * | 6/2005 | Norton et al. | 105/404 |
| 7,001,005 B2 | 2/2006 | Gamberoni et al. | |
| 7,434,520 B2 * | 10/2008 | Zupancich et al. | 105/423 |
| 2001/0011832 A1 | 8/2001 | Ehrlich et al. | |
| 2002/0020129 A1 | 2/2002 | Winter | |
| 2002/0062611 A1 | 5/2002 | Pryor et al. | |
| 2002/0114937 A1 | 8/2002 | Albert et al. | |
| 2002/0134088 A1 | 9/2002 | Rudick et al. | |
| 2002/0144482 A1 | 10/2002 | Henson et al. | |
| 2002/0148181 A1 | 10/2002 | Friesner | |
| 2002/0148196 A1 * | 10/2002 | Barry et al. | 52/742.1 |
| 2002/0148381 A1 | 10/2002 | Norton et al. | |
| 2002/0157565 A1 | 10/2002 | Norton et al. | |
| 2002/0170238 A1 | 11/2002 | Fecko et al. | |
| 2002/0185880 A1 | 12/2002 | Miller | |
| 2003/0041981 A1 | 3/2003 | Cramer, III | |
| 2003/0056456 A1 | 3/2003 | Heydon | |
| 2003/0159404 A1 | 8/2003 | Chang | |
| 2003/0203149 A1 | 10/2003 | Allen et al. | |
| 2004/0020236 A1 | 2/2004 | Vince, II et al. | |
| 2005/0194381 A1 * | 9/2005 | Zupancich et al. | 220/1.5 |
| 2005/0252164 A1 * | 11/2005 | Zupancich et al. | 52/745.02 |
| 2005/0252913 A1 * | 11/2005 | Zupancich et al. | 220/1.6 |
| 2007/0034110 A1 * | 2/2007 | Zupancich et al. | 105/355 |

FOREIGN PATENT DOCUMENTS

| | | | |
|---|---|---|---|
| EP | 0 052 982 A2 | 6/1982 | |
| EP | 0 075 913 A2 | 4/1983 | |
| EP | 0 330 293 A2 | 8/1989 | |
| EP | 0 375 621 A1 | 12/1989 | |
| EP | 0 358 638 B1 | 3/1990 | |
| EP | 0 490 073 B1 | 12/1990 | |
| EP | 0 463 980 B1 | 1/1992 | |
| EP | 0 514 014 B1 | 11/1992 | |
| EP | 0 544 361 B1 | 6/1993 | |
| EP | 0 589 033 B1 | 3/1994 | |
| EP | 0 739 800 A1 | 10/1996 | |
| EP | 0 753 422 B1 | 1/1997 | |

| | | |
|---|---|---|
| EP | 0 904 228 B1 | 3/1999 |
| EP | 0 905 000 A1 | 3/1999 |
| EP | 0 962 343 A2 | 12/1999 |
| EP | 0 967 116 A2 | 12/1999 |
| EP | 1 219 484 A2 | 7/2002 |
| EP | 1 288 112 A1 | 3/2003 |
| JP | 55135294 | 10/1980 |
| JP | 1127451 | 5/1989 |
| JP | 1269663 | 10/1989 |
| JP | 9048369 | 2/1997 |
| JP | 10-147262 | 6/1998 |
| JP | 10-258777 | 9/1998 |
| JP | 10-258779 | 9/1998 |
| JP | 10258778 | 9/1998 |
| JP | 11-210106 | 8/1999 |
| JP | 2000-052982 | 2/2000 |
| JP | 2000-081266 | 3/2000 |
| JP | 2001263897 | 9/2001 |
| JP | 2002-264717 | 9/2002 |
| WO | WO99/10220 | 3/1999 |
| WO | WO99/12787 | 3/1999 |
| WO | WO 0006443 | 2/2000 |
| WO | WO 2004/071885 | 8/2004 |

OTHER PUBLICATIONS

"Fiberglass Reinforced Foam Core Sandwich Panel for Use as Refrigerated Semi-Trailer Side Walls and Roofs", Edford, Allan S., SAE Technical Papers, 820991, (1982).

U.S. Appl. No. 10/957,729, filed Oct. 5, 2004, Seiter.

U.S. Appl. No. 11/104,089, filed Apr. 12, 2005, Zupancich et al.

* cited by examiner

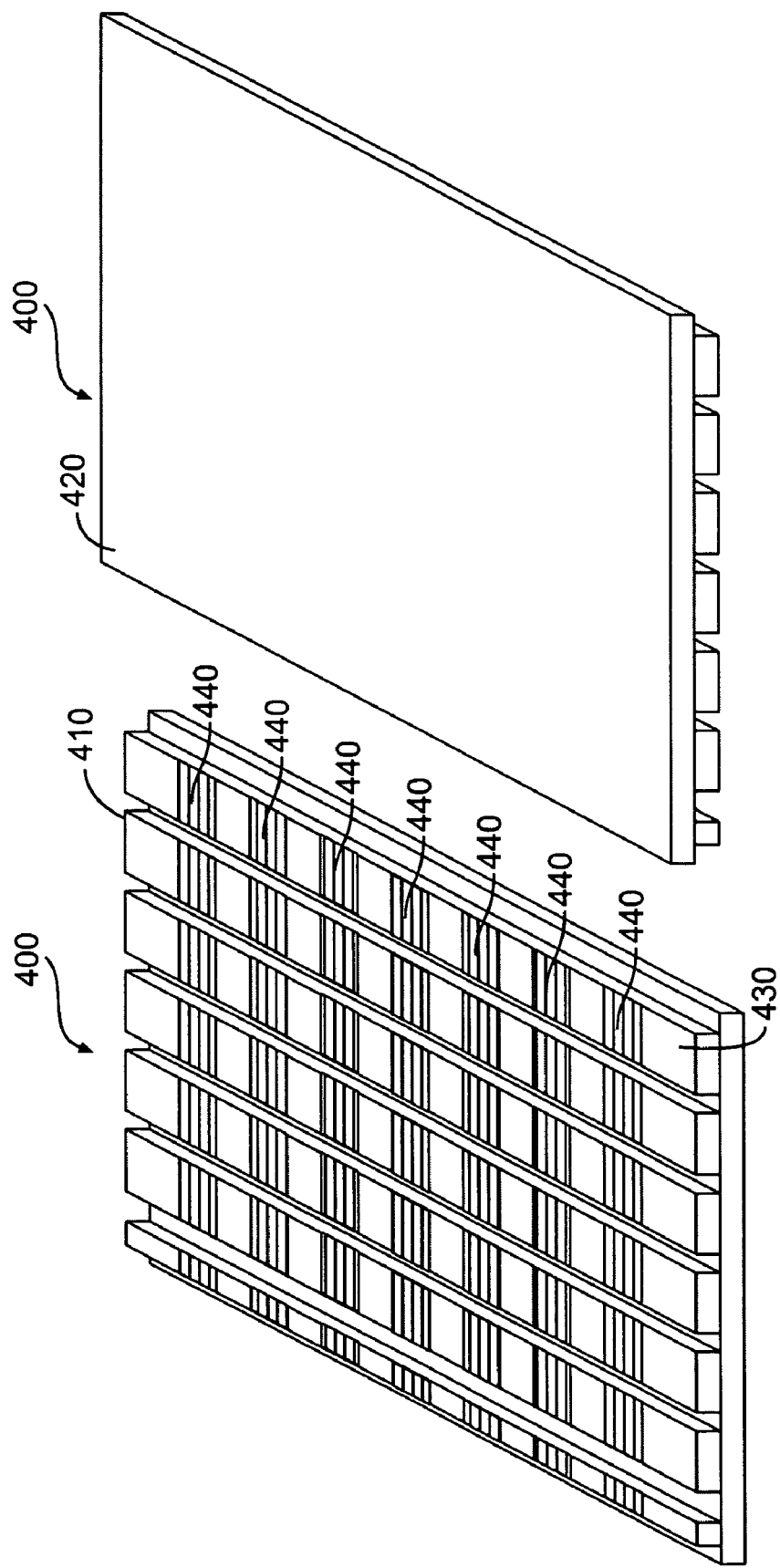

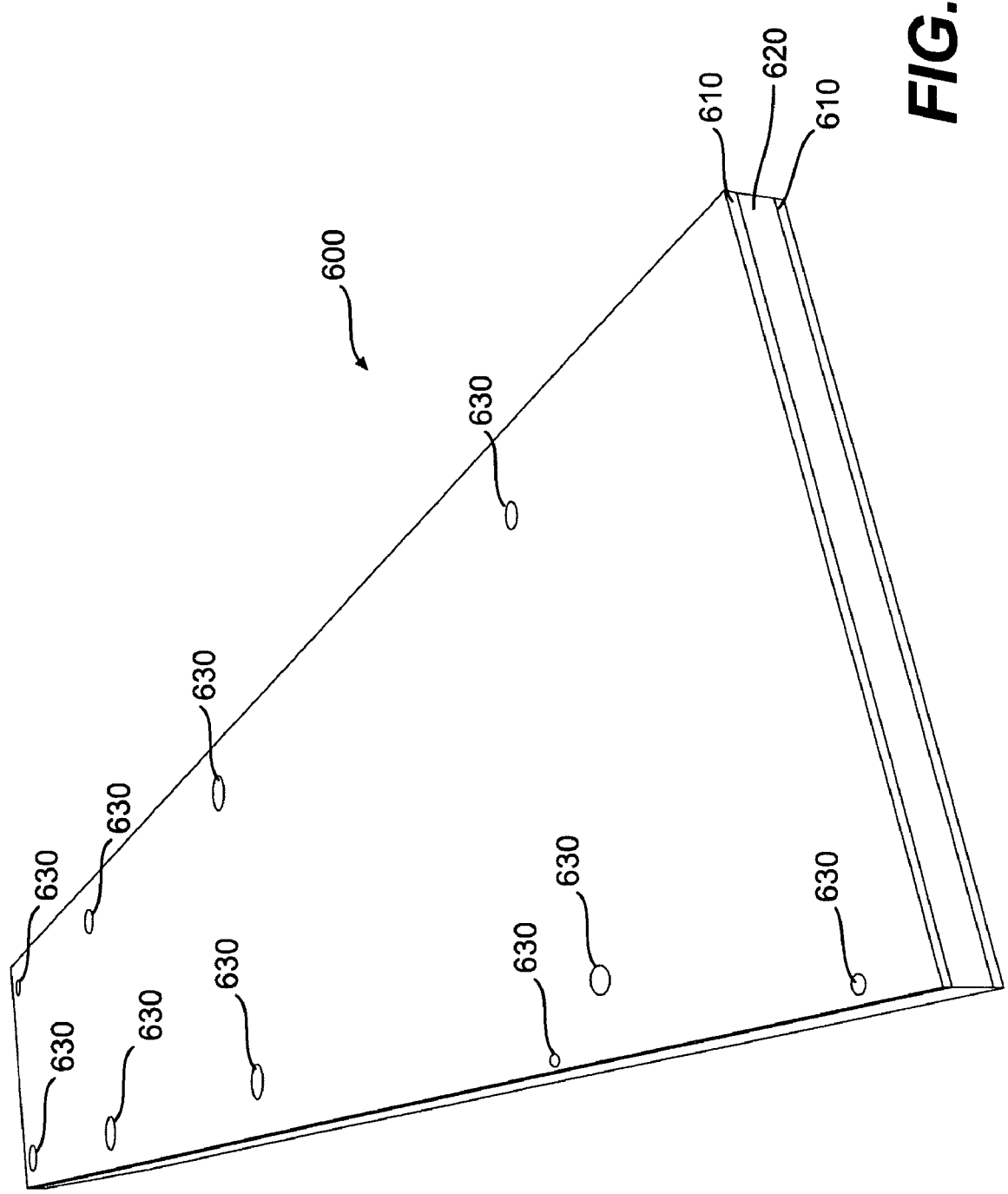

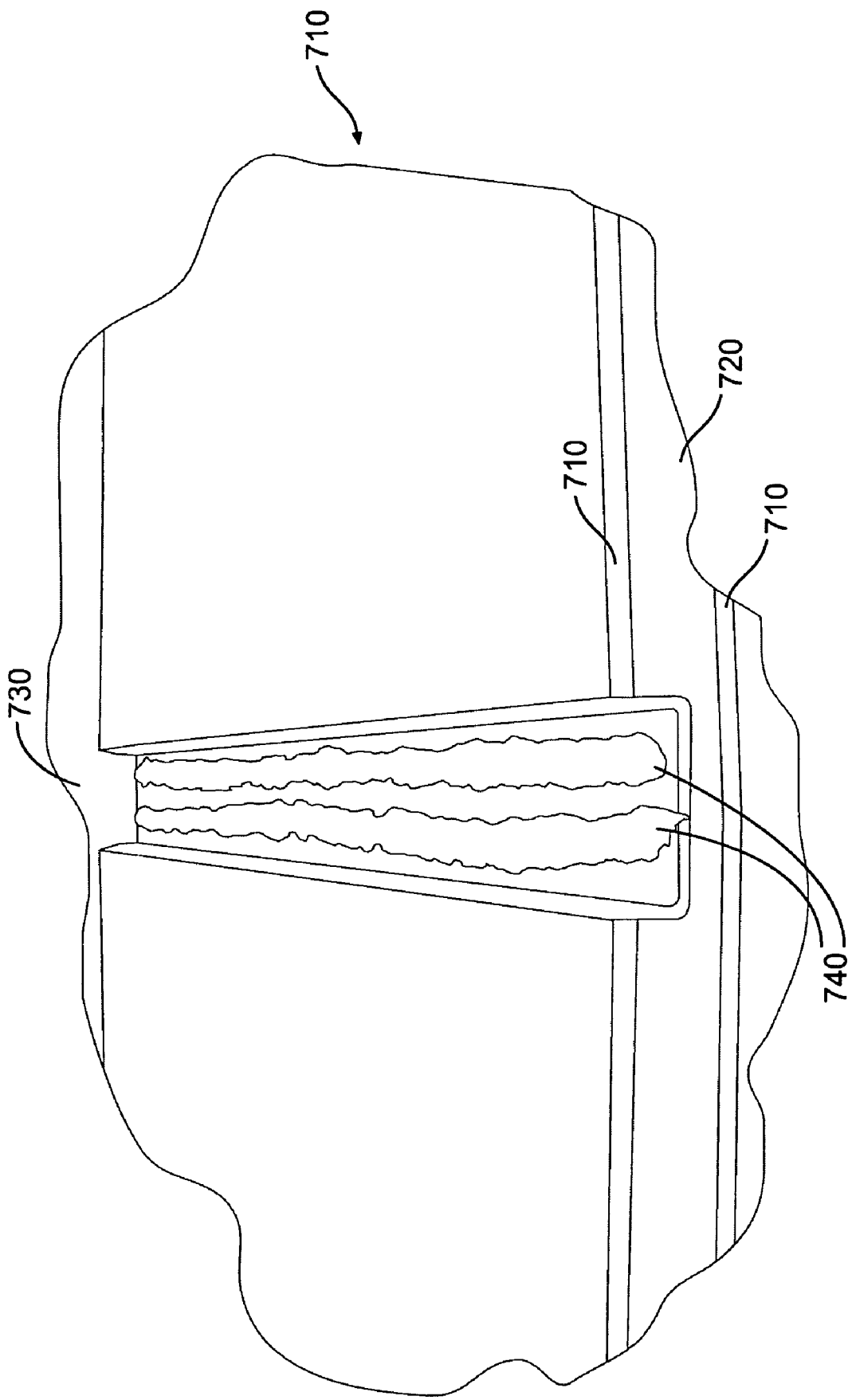

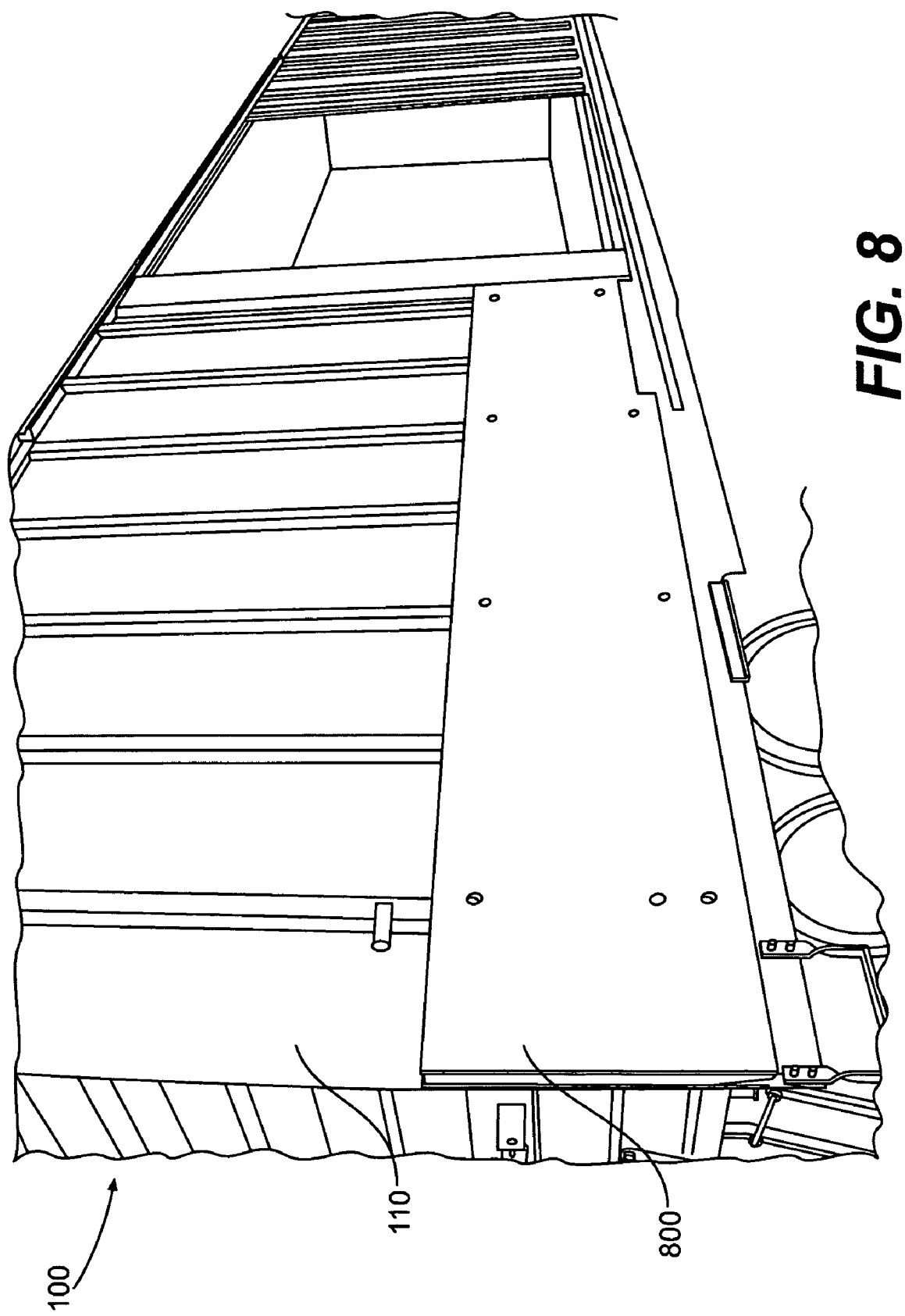

INSULATED CARGO CONTAINERS

I. CROSS-REFERENCE TO RELATED APPLICATION

This is a continuation-in-part application of application Ser. No. 11/072,293, filed Mar. 7, 2005 by Ronald Zupancich and Joseph Seiter and titled INSULATED CARGO CONTAINERS, which claims the benefit of U.S. Provisional Application No. 60/549,929, filed Mar. 5, 2004 by Ronald Zupancich and Joseph Seiter and titled INSULATED CARGO CONTAINERS, both of which are expressly incorporated herein by reference.

II. BACKGROUND

A. Technical Field

The present invention relates to a method of insulating a cargo container and an insulated or refrigerated cargo container. In one embodiment, the cargo container is a railroad boxcar.

B. Related Art

Currently, many shippers utilize insulated or refrigerated large cargo containers (such as boxcars) to transport items that require the maintenance of specified temperatures during transit. Because these containers are required to maintain certain temperatures, the thermal efficiency of these containers is an important feature. Thermal efficiency is characterized by the thermal conductivity of a particular component or its inverse, its resistance to heat transfer commonly referred to as an R value.

In the past, large cargo containers were typically constructed of a combination of wood and metal members. Because members of this type typically possessed a low R-value, insulation, such as foam insulation, was often installed in these cargo containers to increase their thermal efficiency. Even with the use of insulation, however, the thermal efficiency of cargo containers of this type has not been as high as desired by users of these cargo containers. Therefore, there is a need for methods of constructing cargo containers with improved thermal efficiency.

One such existing method has involved placing additional insulating materials on the interior of the container. One drawback of this method is that placing additional insulating materials on the interior of the container reduces the interior dimensions of the cargo container. In turn, reducing the interior dimensions of the cargo container reduces the amount of space available for cargo. In addition, insulating materials located on the interior of a cargo container can also be subject to damage from the placement of cargo in the containers. This also reduces the thermal efficiency of the cargo container. Therefore, there is a need for methods of constructing cargo containers with improved thermal efficiency without substantially reducing the interior dimensions of the car and making the insulating panels less susceptible to loading damage.

The present invention provides a method of constructing cargo containers with improved thermal efficiency without reducing the interior dimensions of the container.

III. SUMMARY OF THE INVENTION

Methods consistent with one embodiment of the present invention provide a method of insulating a cargo container, wherein the cargo container comprises an underframe having a top and bottom surface; a floor connected to the top surface of the underframe; first and second side walls having exterior surfaces; first and second end walls having exterior surfaces, and a roof having an exterior surface, the underframe, floor, first and second side walls; first and second end walls, and roof being connected to form an enclosure. The method includes preparing at least one insulating panel comprising an insulating layer and at least one outer skin located on at least one face of the insulating layer; attaching at least one insulating panel on an exterior surface of the first side wall, wherein the at least one insulating panel substantially covers the exterior surface of the first side wall; attaching at least one insulating panel on an exterior surface of the second side wall, wherein the at least one insulating panel substantially covers the exterior surface of the second side wall; attaching at least one insulating panel on an exterior surface of the first end wall, wherein the at least one insulating panel substantially covers the exterior surface of the first end wall; attaching at least one insulating panel on an exterior surface of the second end wall, wherein the at least one insulating panel substantially covers the exterior surface of the second end wall; attaching at least one insulating panel on an exterior surface of the roof, wherein the at least one insulating panel substantially covers the exterior surface of the roof; installing at least one closure on the boxcar to cover a portion of an exterior surface of the cargo container not covered by a insulating panel; and applying foam insulation to the bottom surface of the underframe.

Methods consistent with another embodiment of the present invention provide a method of insulating a cargo container, wherein the cargo container comprises an underframe having a top and bottom surface; a floor connected to the top surface of the underframe; first and second side walls having exterior surfaces; first and second end walls having exterior surfaces, and a roof having an exterior surface, the underframe, floor, first and second side walls; first and second end walls, and roof being connected to form an enclosure, and a door providing access to the enclosure. The method includes preparing at least one insulating panel comprising an insulating layer and at least one outer skin located on at least one face of the insulating layer; attaching at least one insulating panel on an exterior surface of the first side wall, wherein the at least one insulating panel substantially covers the exterior surface of the first side wall; attaching at least one insulating panel on an exterior surface of the second side wall, wherein the at least one insulating panel substantially covers the exterior surface of the second side wall; attaching at least one insulating panel on an exterior surface of the first end wall, wherein the at least one insulating panel substantially covers the exterior surface of the first end wall; attaching at least one insulating panel on an exterior surface of the second end wall, wherein the at least one insulating panel substantially covers the exterior surface of the second end wall; attaching at least one insulating panel on an exterior surface of the roof, wherein the at least one insulating panel substantially covers the exterior surface of the roof; attaching at least one insulating panel on an interior surface of the door, wherein the at least one insulating panel substantially covers the interior surface of the door; installing at least one closure on the boxcar to cover a portion of an exterior surface of the cargo container not covered by a insulating panel; and applying foam insulation to the bottom surface of the underframe.

Methods consistent with another embodiment of the present invention provide a method of insulating a cargo container, wherein the cargo container comprises an underframe having a top and bottom surface; a floor connected to the top surface of the underframe; first and second side walls having exterior surfaces; first and second end walls having exterior surfaces, and a roof having an exterior surface, the underframe, floor, first and second side walls; first and second end walls, and roof being connected to form an enclosure, and a door providing access to the enclosure. The method includes preparing at least one insulating panel comprising an insulating layer and at least one outer skin located on at least one face of the insulating layer; attaching at least one insulating panel on an exterior surface of the first side wall, wherein the at least one insulating panel substantially covers the exterior surface of the first side wall; attaching at least one insulating panel on an exterior surface of the second side wall, wherein the at least one insulating panel substantially covers the exterior surface of the second side wall; attaching at least one insulating panel on an exterior surface of the first end wall, wherein the at least one insulating panel substantially covers the exterior surface of the first end wall; attaching at least one insulating panel on an exterior surface of the second end wall, wherein the at least one insulating panel substantially covers the exterior surface of the second end wall; attaching at least one insulating panel on an exterior surface of the roof, wherein the at least one insulating panel substantially covers the exterior surface of the roof; attaching at least one insulating panel on an interior surface of the door, wherein the at least one insulating panel substantially covers the interior surface of the door; installing the at least one closure on the boxcar to cover a portion of an exterior surface of the cargo container not covered by a insulating panel; removing the floor; attaching at least one insulating member to the top surface of the underframe; and attaching at least one floor panel on the insulating members to form a floor of the cargo container; and applying foam insulation to the bottom surface of the underframe.

Another embodiment of the present invention is a cargo container. The cargo container comprises an underframe having a top and bottom surface; a floor connected to the top surface of the underframe; first and second side walls having exterior surfaces; first and second end walls having exterior surfaces, and a roof having an exterior surface. The underframe, floor, first and second side walls; first and second end walls, and roof of the cargo container are connected to form an enclosure. The cargo container also includes at least one insulating panel comprising an insulating layer and at least one outer skin located on at least one face of the insulating layer, the at least one insulating panel located on the exterior surface of at least one of the first side wall, second side wall, first end wall, second end wall, or roof. In addition, the R-Value of the cargo container is at least 28.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

IV. BRIEF DESCRIPTION OF THE DRAWINGS

FIG. 4A is a bottom perspective view of a floor panel consistent with one embodiment of the invention;

FIG. 4B is a top perspective view of a floor panel consistent with one embodiment of the invention;

FIG. 6 is a top perspective view of a side panel consistent with one embodiment of the invention;

FIG. 7 is a schematic view of a portion of a side panel with adhesive applied thereto consistent with one embodiment of the invention;

FIG. 8 is a schematic view of a portion of a boxcar with a side panel installed consistent with one embodiment of the invention;

V. DESCRIPTION OF THE EMBODIMENTS

A. Introduction

As described below, methods and apparatus consistent with the present invention will now be described with respect to the modification of one embodiment of an existing cargo container: a boxcar. The invention as claimed, however, is broader than boxcars and extends to the modification of other large insulated cargo containers, such as, shipping containers used on seagoing container vessels, truck trailers, straight trucks, refrigerated buildings, or the like.

Figure 1A:
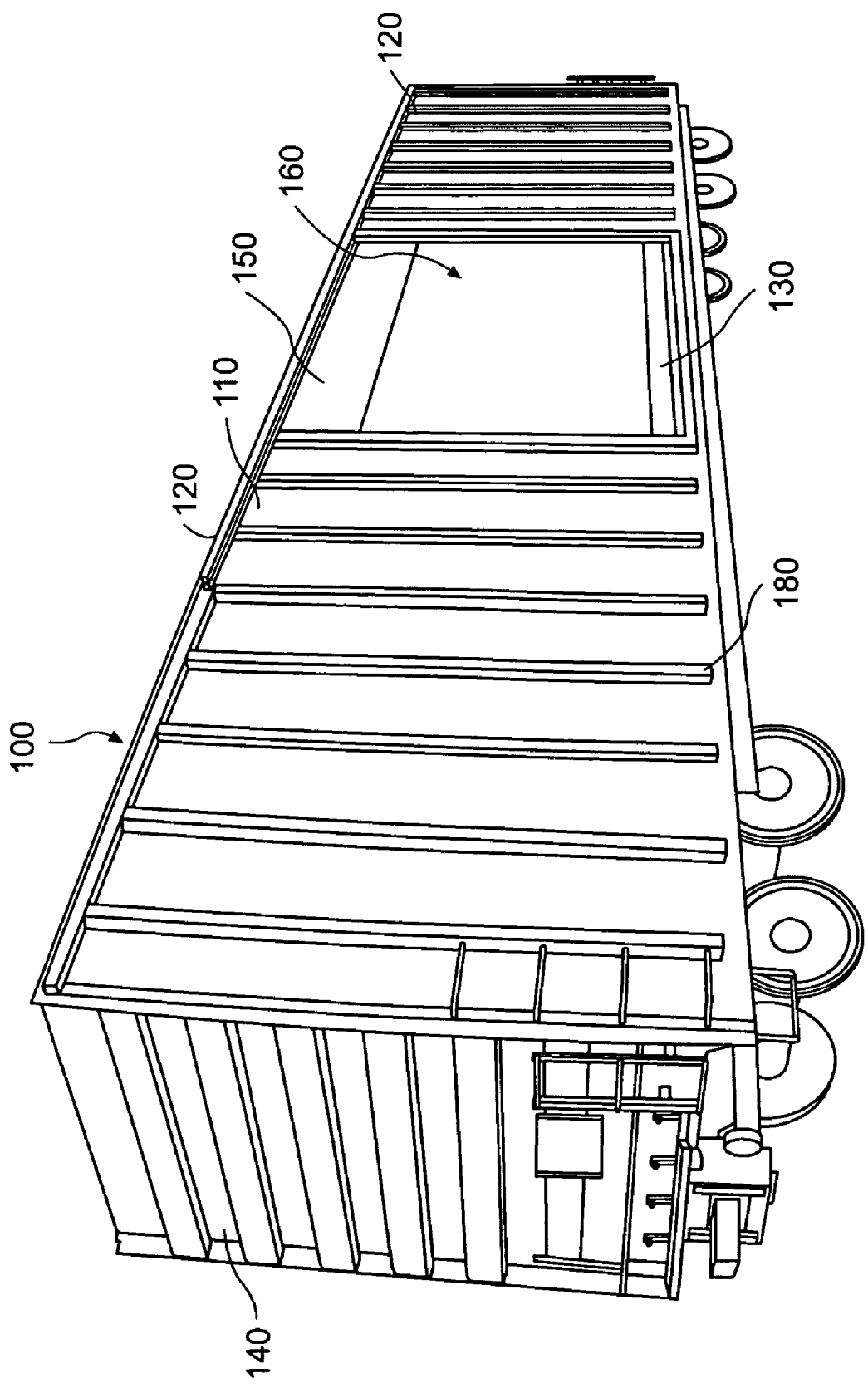
FIG. 1A is a perspective view of a boxcar.
Figure 1B:
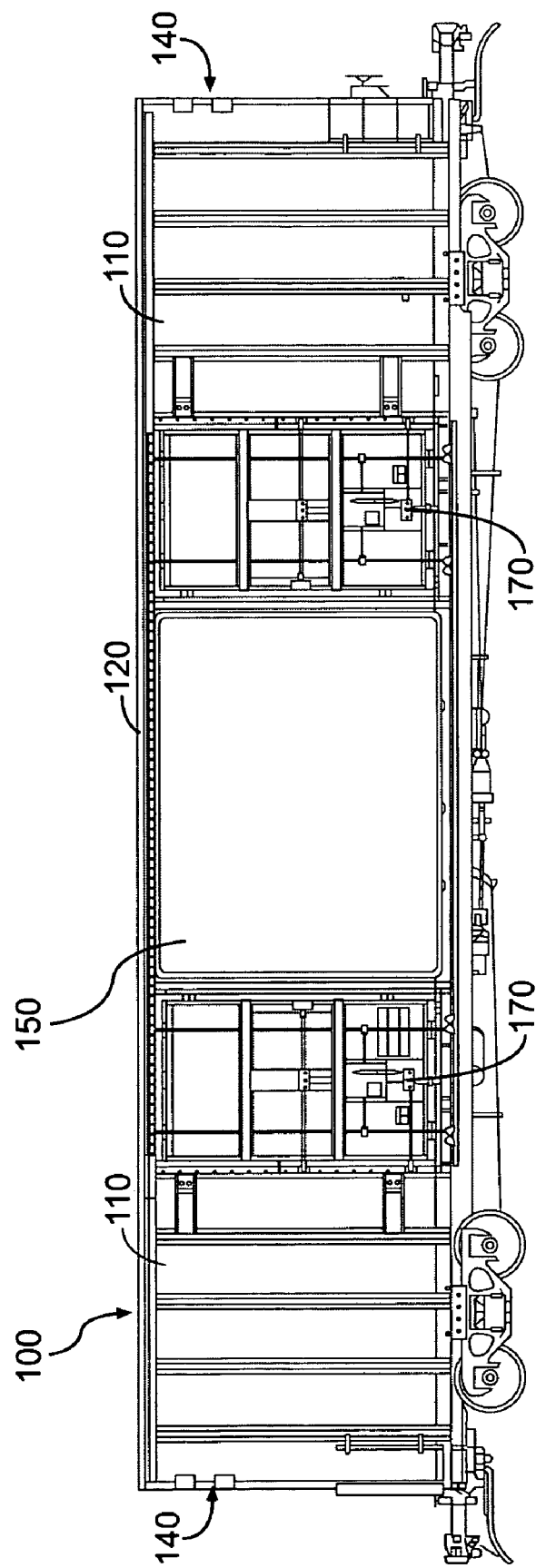
FIG. 1B is a side view of a boxcar.

FIGS. 1A-1B illustrate a boxcar to be modified consistent with one embodiment of the present invention. FIGS. 2-32 illustrate methods of modifying the existing boxcar consistent with embodiments of the present invention. As discussed, however, the methods illustrates in FIGS. 2-32 can be applied to other cargo containers.

B. Apparatus and Methods

FIGS. 1A-1B illustrate two views of a boxcar. A boxcar is an enclosed rail car used to transport freight. As shown in FIGS. 1A-1B, a boxcar 100 includes side walls 110, a roof 120, a floor 130, end walls 140, and a door opening 150. Wall panels 110, roof 120, floor 130, and end walls 140 combine to form an enclosure 160. Door opening 150 provides access to enclosure 160. Enclosure 160 can be used to store articles at specified temperatures. As shown in FIG. 1B, boxcar 100 may also include doors 170.

As described above, the thermal efficiency of boxcar 100 depends, in part, on the construction of side walls 110, roof 120, floor 130, end walls 140, and doors 170. As described in FIGS. 2-32, the present invention provides a method of insulating a boxcar, such as boxcar 100.

Figure 2:
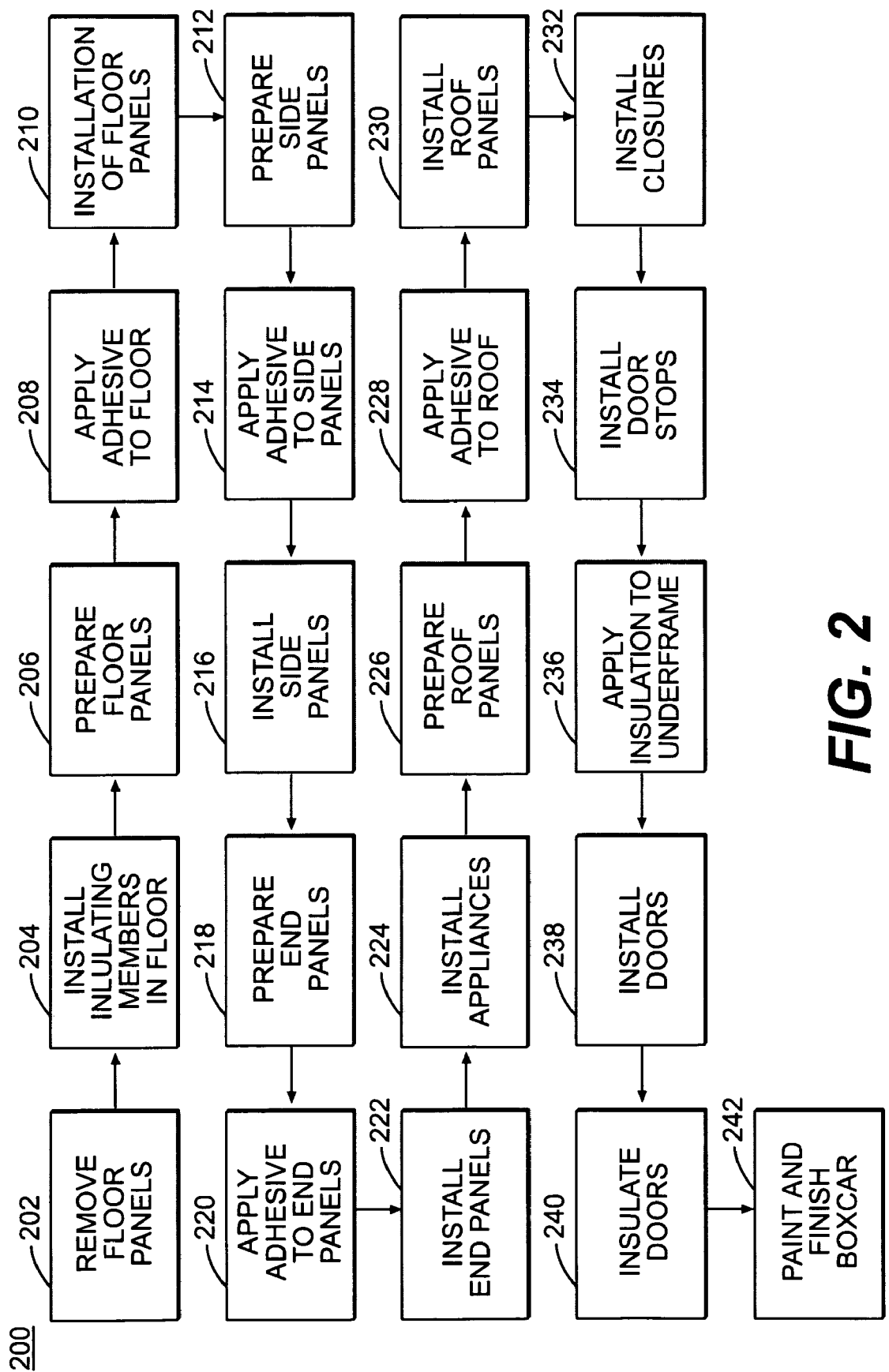
FIG. 2 is a block diagram illustrating a method of insulating a boxcar consistent with one embodiment of the invention.

FIG. 2 is a block diagram illustrating a method of insulating a boxcar consistent with one embodiment of the invention. The steps of the method 200 of FIG. 2 are described in detail below. It should be understood that the steps of method 200 need not be performed in the order depicted, and many additional orders may be used.

In this implementation, the first step in method 200 is removing the existing boxcar floor panels (step 202). As shown in FIG. 1, a boxcar, such as boxcar 100, typically includes a floor, such as floor 130. A floor will usually comprise a floor panel or panels having a top surface, which forms the interior floor surface of enclosure and a bottom surface, which forms an outer surface of the boxcar. In addition, the floor will usually include an underframe under the floor panel or panel. The underframe may include structural members, which are members which provide structural support to the floor panel or panels by supporting some portion of the load applied to the floor panel or panels. I-Beams and center sills are examples of such structural members. In this step, the floor panel or panels are removed to allow access to the existing structure below the floor panel, such as the structural members described above. The floor panel or panels may be removed using any number of well known methods, including the use of machinery to lift the floor panels from the structure. This implementation is merely exemplary, and other implementations may also be used.

In this implementation, the next step is installing insulating members in the boxcar floor (step 204). As described above, in most boxcars, the floor includes structural members supporting the floor panel or panels. These structural members are usually exposed to ambient conditions. Therefore, the connection of these structural members to the floor panel can create a thermal short. A thermal short in an insulated enclosure is a portion of the structure where heat loss can bypass insulation and thereby reduce the thermal efficiency of the enclosure. For example, in one implementation in which a boxcar constructed according to the claimed invention has an R-value of 28, any portion of the boxcar with an R-value less than 28 will be considered a thermal short. In this step, insulating members are installed between the structural members and the floor panel to remove potential thermal shorts. Insulating members are members constructed of an insulating material and in such a shape to reduce thermal conductivity. This implementation is merely exemplary, and other implementations may also be used.

Figure 3:
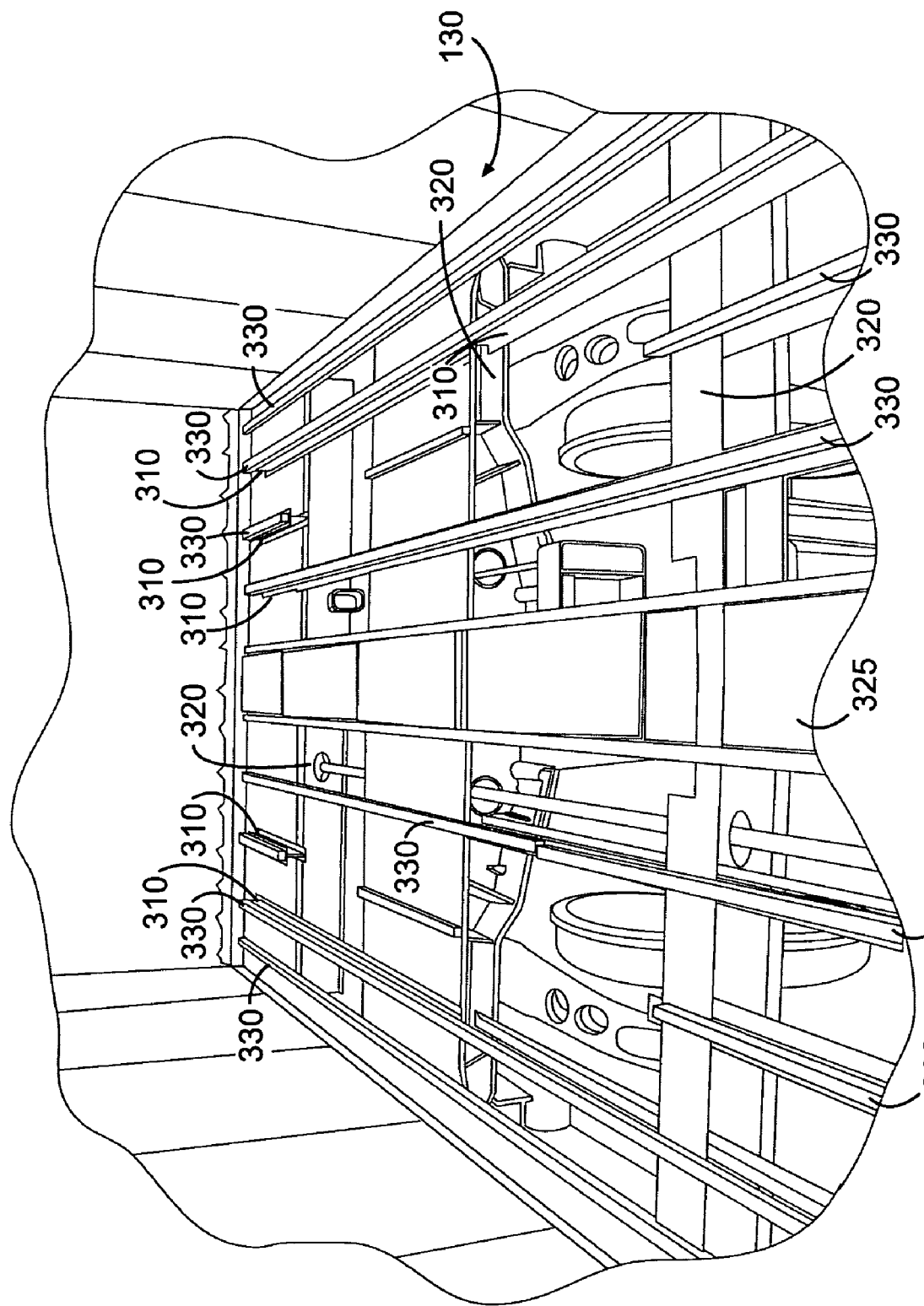
FIG. 3 is a schematic view of a portion of a boxcar floor with insulating members installed consistent with one embodiment of the invention.

FIG. 3 is a schematic view of a portion of a boxcar floor with insulating members installed consistent with one embodiment of the invention. As described above, floor panels have been removed from boxcar floor 130. As shown in FIG. 3, floor 130 comprises structural members as described above, such as I-Beams 310, cross members 320, and center sill 325. As shown in FIG. 3, insulating members 330 have been installed on various structural members. Insulating members 330 may be constructed of any material including composites or wood and in any shape suitable to reduce heat loss from the connection of structural members, such as center sill 325 and I-Beams 310 to a floor panel. Insulating members 330 may be located on each structural member (i.e., center sill 325 and I-Beams 310) or only on certain structural members. In one implementation, insulating members 330 may be constructed to withstand at least 10 psi. These implementations are merely exemplary and other implementations may also be used.

In one implementation, insulating members 330 have a generally four-sided-shape cross-section and extend longitudinally. For example, insulating members 330 may have a parallelogram-shaped cross-section, a trapezoidal-shaped cross-section, a rectangular-shaped cross-section, or a square-shaped cross section. Insulating members 330 may be the same length as, shorter than, or longer than the structural member to which they are attached. In one implementation, insulating members 330 are constructed by pultrusion from fiber-reinforced plastics and are attached to structural members with a structural adhesive, such as PLIOGRIP™ 7700. These implementations are merely exemplary and other implementations may also be used. For example, insulating members with generally U or I-shaped cross sections may be used. In addition, other means of attaching insulating members 330 may be used such as bolts or other mechanical fasteners. These implementations are merely exemplary and other implementations may also be used.

In another implementation, a liner is applied to the underframe of an existing cargo container. The liner may be constructed of any sheet material such, as wood, polymers, metal, or laminates, or any combination thereof. In one implementation sheet steel will be used. In this implementation, insulating members, such as those described above, will be attached to the liner. The insulating members may be applied using any suitable means, such as adhesives or mechanical fasteners. In another implementation, insulation will then be applied to the liner in the area between the insulating members. These implementations are merely exemplary and other implementations may also be used.

As shown in FIG. 2, in one implementation, following installation of the insulating members in the floor, the next step is the preparation of the floor panels (step 206. The floor panels may be of any size or construction suitable to form a floor of a cargo container. For example, in one implementation, only a single panel, which extends the length and width of the cargo container, is used. In another implementation, multiple floor panels are used, which when connected to one another, will generally extend the length and width of the cargo container. In this implementation, the multiple panels may be connected by mechanical fasteners, interlocking edges, adhesives, or welding. The thickness of the floor panels can vary, and should be suitable to support the weight of the cargo to be held in the cargo container. Typically, the floor panels will be constructed of a metal, such as steel, however, other materials may be used. In one implementation, the floor panels removed in step 202 will be reused. In other implementations, new floor panels may be used. These implementations are merely exemplary, and other implementations may also be used.

In one implementation, this step (206) includes preparing the bottom surface of the floor panel for adhesion to the insulating members and/or structural members. Preparing the bottom surface may include abrading segments of the floor panel to improve adhesion to the insulating members and/or structural members. In one implementation, the bottom surface of the floor will be sanded to improve adhesion. The surface could be abraded by other methods, such as grinding, sand blasting or the like. This implementation is merely exemplary, and other implementations may also be used.

FIGS. 4A and 4B are two views of a floor panel consistent with one embodiment of the invention. As shown in FIG. 4, in one implementation, floor panel 400 comprises a top surface 410 and a bottom surface 420. The floor panel 400 also includes protrusions 430. As further shown in FIG. 4, segments 440 of bottom surface 420 have been abraded as described above to improve adhesion to insulating members and/or structural members when floor panel 400 is installed. This implementation is merely exemplary, and other implementations may also be used.

In another implementation, the floor panels will be constructed of a material which will allow nails or other mechanical fasteners to affixed into the floor panel. A nailable floor will allow cargo to be secured to the floor of a boxcar. The nailable floor panels may be constructed using several well known methods including the use of nested metal planks. This implementation is merely exemplary, and other implementations may also be used.

As shown in FIG. 2, in one implementation, following preparation of the floor panel, the next step is application of the adhesive to the floor (step 208). In this step, adhesive is applied to the floor panel, the structural members, or the insulating members or any combination of these items to adhere the floor panel to the structural members and/or insulating members. In one implementation, a structural adhesive, such as PLIOGRIP™ 7700 available from Ashland Specialty Chemical Company is used. The adhesive may be applied using well-known methods, such as using a manual adhesive "gun" or a powered adhesive dispenser. This implementation is merely exemplary, and other implementations may also be used.

As shown in FIG. 2, in one implementation, following application of the adhesive, the next step is the installation of the floor panels (step 210). In this step, the floor panels (prepared for installation as described above) are installed in the boxcar to form the boxcar floor. Any number of methods may be used to install the floor panels in the boxcar floor.

Figure 5A:
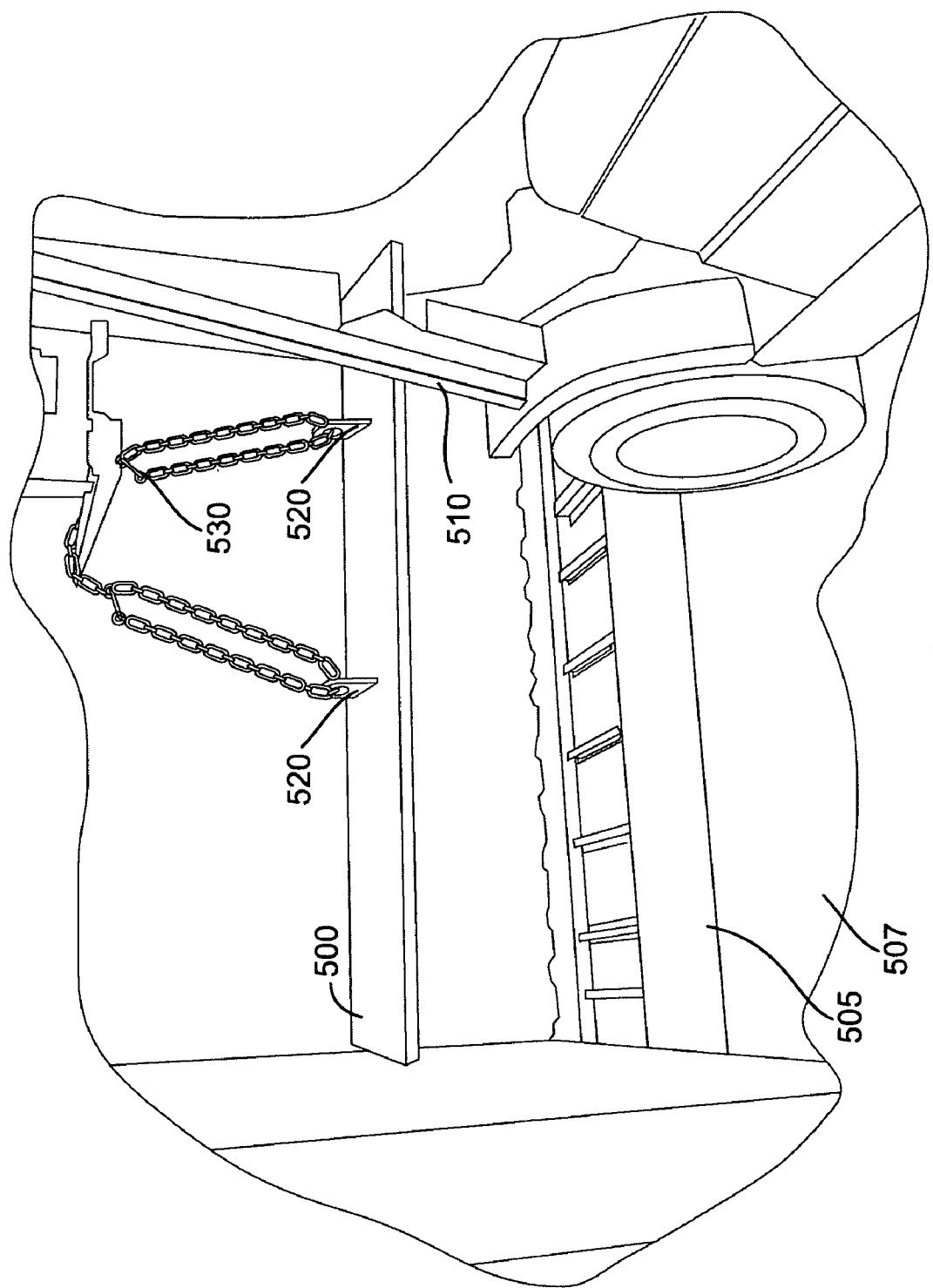
FIG. 5A is a schematic view of a forklift installing a floor panel in a portion of a boxcar floor consistent with one embodiment of the invention.

FIG. 5A is a schematic view of a forklift installing a floor panel in a portion of a boxcar floor consistent with one embodiment of the invention. As shown in FIG. 5A, in one implementation, a floor panel 500 is being installed using a forklift 510. In FIG. 5A, floor panels 505 and 507 have already been installed. In this implementation, handles 520 are installed on floor panel 500. Handles 520 provide a means for allowing floor panel 500 to be installed by providing points at which floor panel 520 may be lifted. Handles 520 may be constructed of any suitable material, such as metal, plastics, or composites and installed using any well-known method, such as welding, mechanical fasteners, or adhesive. For example, in one implementation, handles 520 are metal and are installed on floor panel by welding. This implementation is merely exemplary, and other implementations may also be used.

As shown in FIG. 5A, in order to lift floor panel 500 a chain 530 is placec through handles 520. Forklift 510 is then used to lift chain 530 thereby lifting floor panel 500. Forklift 510 may then be used to lower floor panel 500 into its proper location. It should be understand that other methods, such as manual installation, may be used to install floor panel 500. This implementation is merely exemplary, and other implementations may also be used.

Figure 5B:
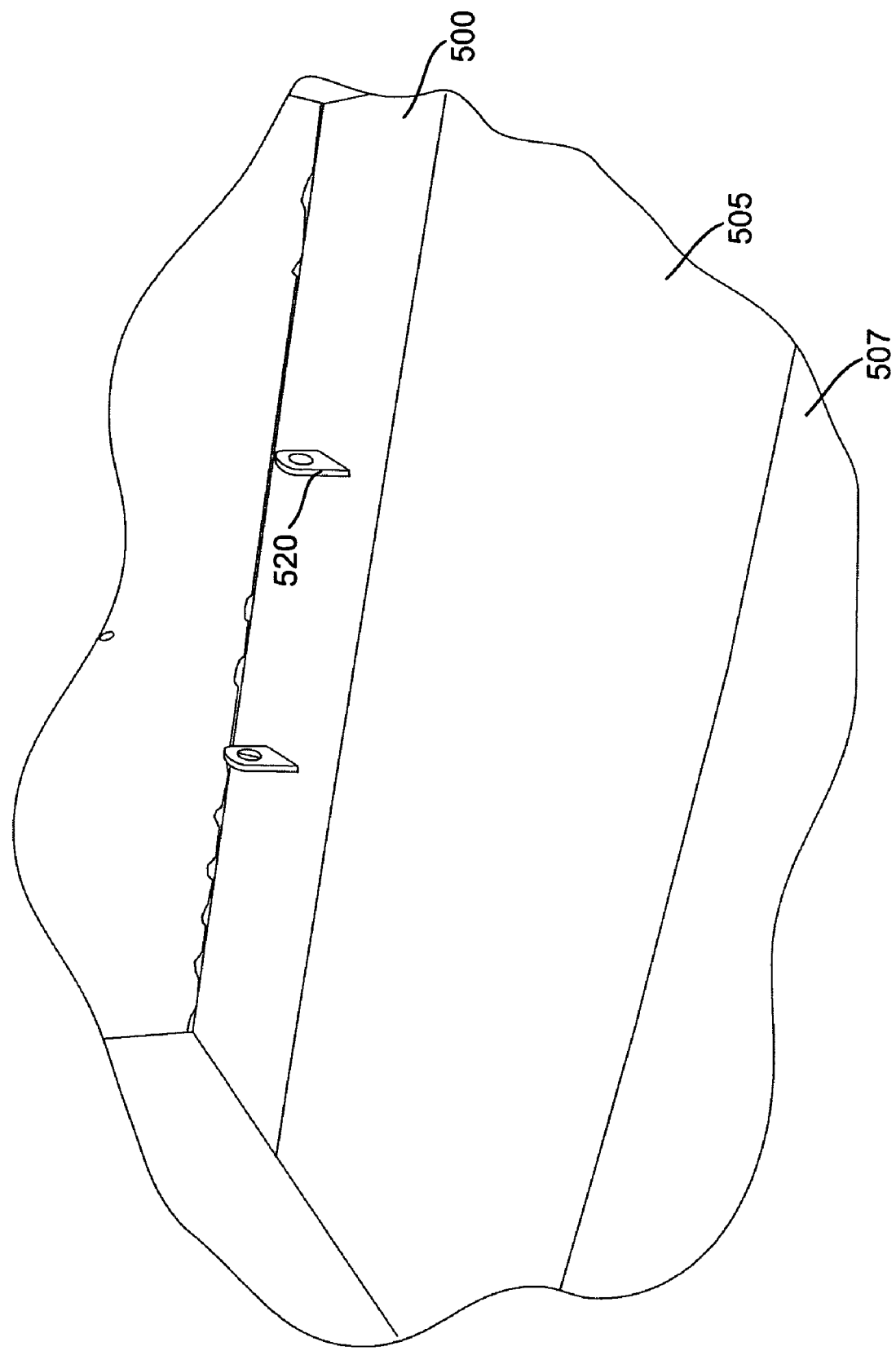
FIG. 5B is a schematic view of a boxcar floor with floor panels installed consistent with one embodiment of the invention.

FIG. 5B is a schematic view of a boxcar floor with floor panels installed consistent with one embodiment of the invention. As shown in FIG. 5B, floor panel 500 (described above) has been installed in the floor of a boxcar. As described above, in one implementation, prior to installation of the floor panel, adhesive is applied to the floor panel, structural members, and/or insulating members. After installation of the floor panel, the adhesive will act to adhere floor panel 500 to the structural and/or insulating members. In one implementation, mechanical fasteners may also be used to attach the floor panel to the structural and/or insulating members. In another implementation, weights may be placed on the floor panel to compress the adhesive between the surface to be adhered to promote the adhesion process. In addition, in one implementation, following installation of the floor panel, handles 520 may be removed. The method of removal may depend on how the handles were applied and can include washing, cutting, debonding agents, or removal of mechanical fasteners. These implementations are merely exemplary, and other implementations may also be used.

As described above, in one implementation, the floor of the boxcar comprises multiple floor panels, such as floor panels 500, 505, and 507 depicted in FIG. 5B. As further described above, the floor panels may be connected to one another by mechanical fasteners, interlocking edges, adhesives, or welding. During step 210 of FIG. 2 (installation of floor panels) all the floor panels will be installed and, if desired, connected to one another, such that at the completion of this step, boxcar 100 includes a floor extending the length and width of the boxcar.

As shown in FIG. 2, following installation of the floor panel, in one implementation, the next step is preparation of the side panels (step 212). In this step, side panels are constructed and prepared for installation. Side panels are insulating panels that will be installed on the exterior surfaces of the side walls (such as side walls 110) of a boxcar (such as boxcar 100). Side panels are described in more detail below with respect to FIG. 6.

FIG. 6 is a perspective view of a side panel consistent with one embodiment of the invention. As shown in FIG. 6, a side panel 600 is an insulated panel constructed of an outer skin 610 on at least one face of an insulating layer 620. In one implementation, as shown in FIG. 6, outer skin 610 is located on opposing faces of insulating layer 620. In another implementation, outer skin 610 is located on the front and side surfaces of insulating layer 620. In one implementation, the outer skin 610 is constructed of galvanized steel, aluminum, stainless steel, fiber-reinforced plastics or some combination of these materials. In addition, outer skin 610 may be constructed to be dent resistant, corrosion resistant, or puncture resistant using the materials described above, as is well known in the art. When outer skin 610 is located on multiple faces of insulating layer 620, the outer skin 610 located on each face may be constructed of different materials. For example, in one implementation, outer skin 610 located on one face will be constructed of fiber reinforced plastics, while the outer skin 610 located on the opposing face will be constructed of galvanized steel. In still another implementation, the outer skin 610 located on one face of insulating layer 620 will be stronger than the outer skin 610 located on the opposing face of insulating layer 620. These implementations are merely exemplary, and other implementations may also be used.

Insulating layer 620 may be constructed from any insulating material that will increase the thermal efficiency of the side panel. In one implementation, insulating layer 620 comprises a closed-cell polymer foam, such as urethane. In another implementation, insulating layer 620 comprises a vacuum insulated panel. Vacuum insulated panels are constructed of an intermediate film or laminate providing a barrier to passage of air into an interior porous insulating material that has been evacuated to increase its insulating value. In one implementation, the interior porous insulating material comprises a micro-cellular open-cell foam core material. In one implementation, the diameter of the cells is on the order of $10^{-6}$ in. A one inch thick sheet of such a material may have a R-value (evacuated) of approximately 28. A micro-cellular, open-cell polystyrene foam, such as INSTILL™ available from Dow Chemicals may be used in such an implementation. In yet another implementation, the porous insulating material is a fine fiberglass web core material. In one implementation, each fine fiberglass strand will have a diameter of approximately 0.001 in. A one inch thick sheet of such a material may have a R-value (evacuated) of approximately 40. A fine fiberglass web core material such as THRESHOLD™ available from Thermal Visions may be used in such an implementation. In another implementation, insulation layer 620 comprises a combination of foam and vacuum insulated panels. These implementations are merely exemplary, and other implementations may be used.

As indicated above, side panels, such as side panel 600, are intended for installation on the exterior surfaces of the side walls of the boxcar. Therefore, in one implementation, side panels are constructed in a shape such that they may be overlaid on the exterior surfaces the sidewalls of a boxcar. For example, as shown in FIG. 1A, side walls 110 of boxcar 100 contains protrusions, such as protrusion 180 on boxcar 100. Therefore, in one implementation, side panel 600 includes indentations (shown in FIG. 7) so that side panel 600 can fit over the protrusions on the exterior portion of the boxcar. Side panels 600 may be constructed from any of several well-known methods. Side panel 600 may be constructed of a different material than sidewalls 110. Therefore, in one implementation, side walls 110 of boxcar 100 may be stronger than side panels 600. This may be desirable due to the fact that the inner walls of many boxcars are subjected to strong impacts from forklifts during loading an unloading, whereas exterior walls are less likely to be subject to such forces. These implementations are merely exemplary, and other implementations may also be used.

In another implementation, as shown in FIG. 6, side panel 600 also includes holes 630. As discussed below, holes 630 may be used to install a mechanical fastener in side panel 600 for attaching side panel 600 to a boxcar. Holes 630 may be created using any of several well-known methods including drilling. This implementation is merely exemplary, and other implementations may also be used.

As shown in FIG. 2, following preparation of the side panels, in one implementation, the next step is application of adhesive to the side panels (step 214). In this step, adhesive is applied to the side panels to adhere the side panels to the exterior surfaces of the side walls of a boxcar. In one implementation, the adhesive may be a structural adhesive such as Pliogrip 7700. This implementation is merely exemplary, and other implementations may also be used.

FIG. 7 is a schematic view of a portion of a side panel with adhesive applied thereto consistent with one embodiment of the invention. Side panel 700 is a side panel as described above including an exterior skin 710, insulating layer 720, and indentation 730. In one implementation, an adhesive 740 is applied to side panel 700 to adhere side panel 700 to the exterior side walls of a boxcar. As shown in FIG. 7, in one implementation, adhesive 740 is applied in indentation 730 so that it adheres to protrusion 180, shown in FIG. 2 when the side panel is offered thereto. Adhesive 740 may be applied, however, to any portion of outer skin 710. In another implementation, small relatively nondeformable objects may be placed in the adhesive. By having such objects in the bondline, a specified bondline thickness may be achieved when pressure is used to adhere side panel 700 to the exterior side walls of a boxcar. Examples of such nondeformable objects include glass beads and chopped wire, though any suitable objects may be used. This implementation is merely exemplary, and other implementations may also be used.

As shown in FIG. 2, following preparation of the side panels, in one implementation, the next step is application of adhesive to the side panels (step 214). In this step, adhesive is applied to the side panels to adhere the side panels to the exterior surfaces of the side walls of a boxcar. In one implementation, the adhesive may be a structural adhesive such as PLIOGRIP™ 7700. This implementation is merely exemplary, and other implementations may also be used.

Figure 9:
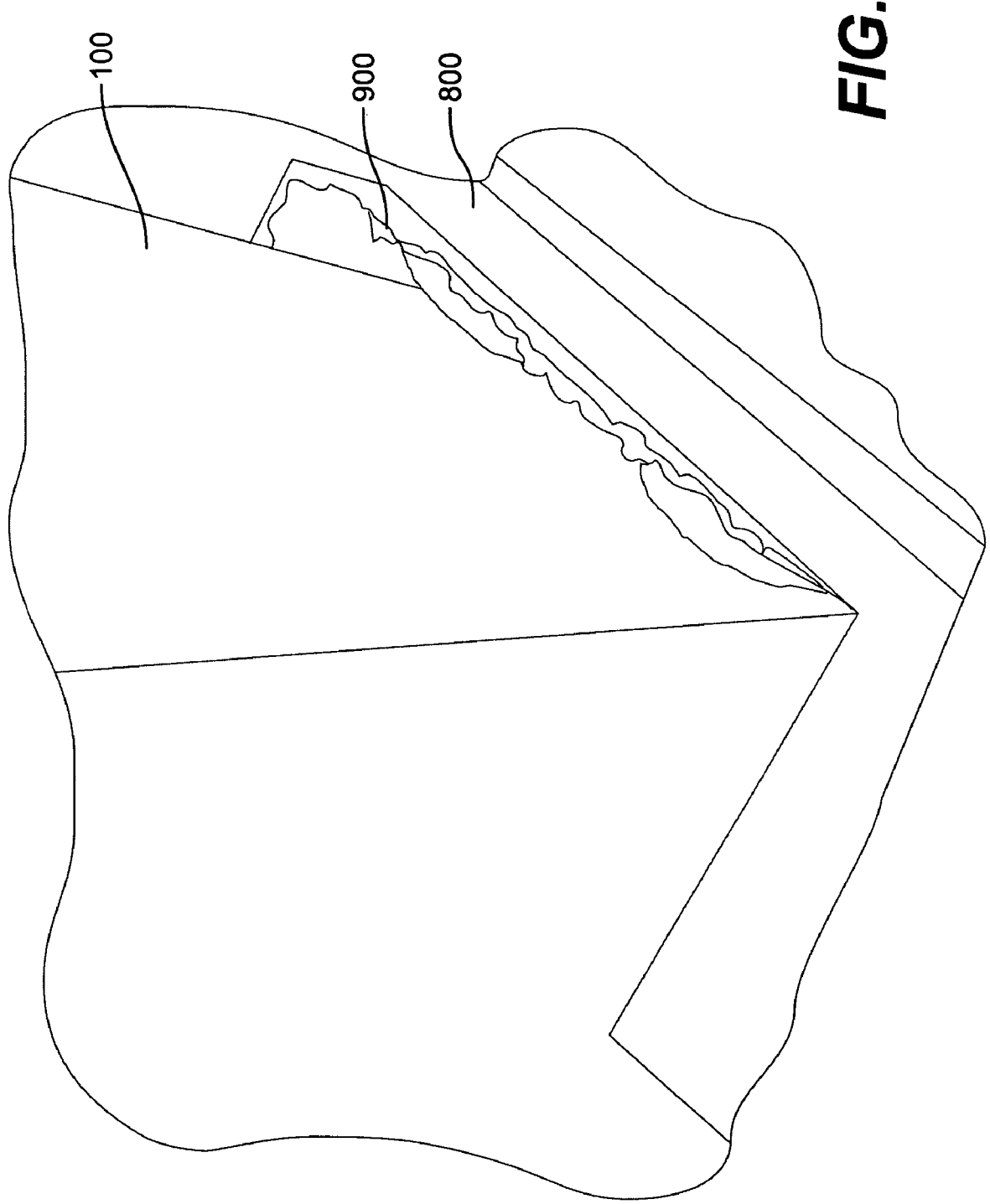
FIG. 9 is a schematic view of a portion of a boxcar sidewall with a side panel adhered thereto consistent with one embodiment of the invention.
Figure 10:
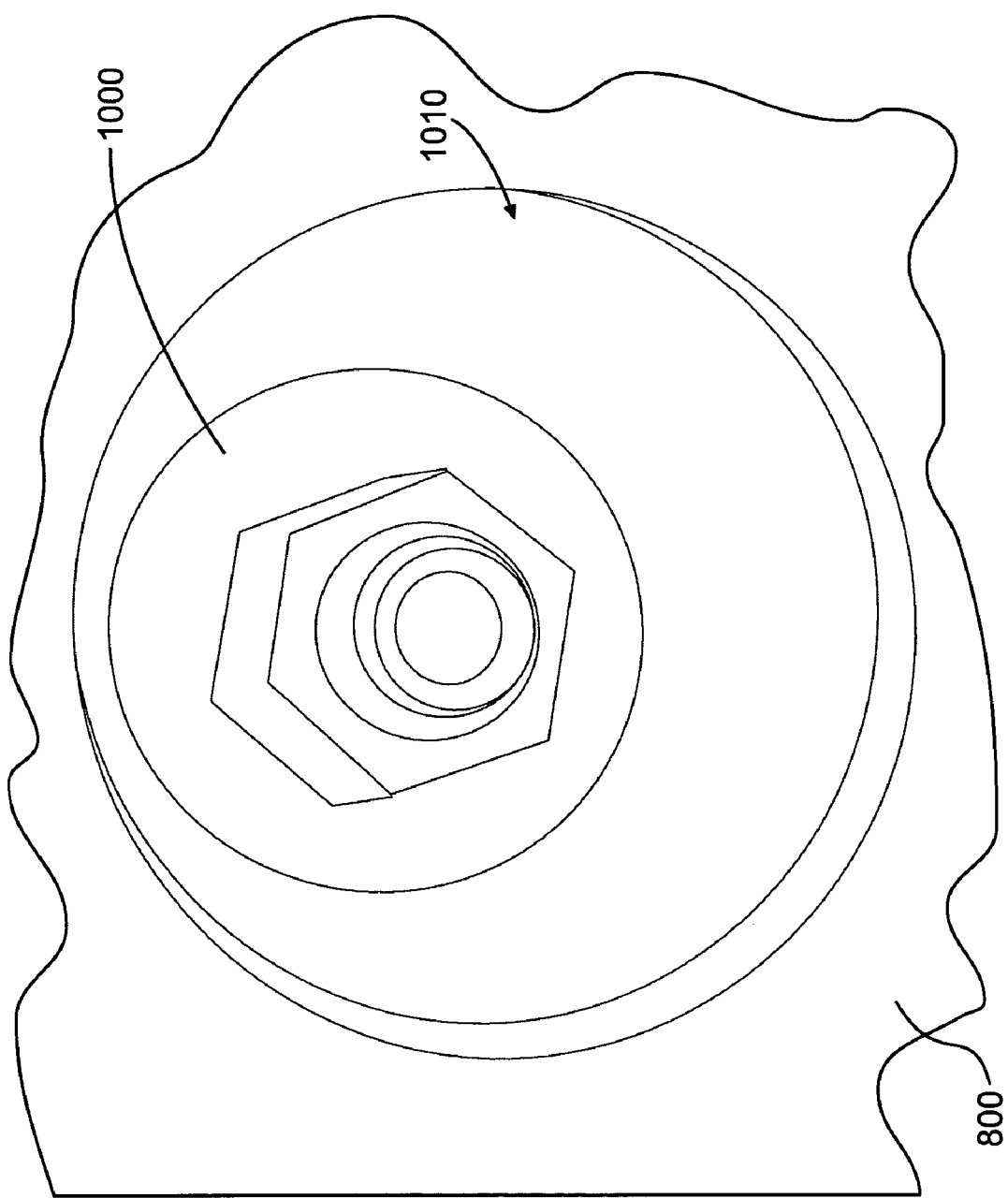
FIG. 10 is a schematic view of a mechanical fastener installed in a side panel consistent with one embodiment of the invention.

As discussed above, adhesives are used to attach side panel 800 to boxcar 100. FIG. 9 is a schematic view of a portion of a boxcar sidewall with a side panel adhered thereto consistent with one embodiment of the invention. As shown in FIG. 9, adhesive 900 bonds side panel 800 to boxcar 100. In addition to adhesives, mechanical fasteners may be also used to further attach side panel 800 to boxcar 100. FIG. 10 is a schematic view of a mechanical fastener installed in a side panel consistent with one embodiment of the invention. As shown in FIG. 10, a fastener 1000 is inserted in a hole 1010 in side panel 800 to attach a side panel to boxcar 100. As shown in FIG. 10, fastener 1000 includes a washer, nut, and bolt. Fastener 1000, however, may be any fastener suitable for attaching side panel 800 to boxcar 100. These implementations are merely exemplary, and other implementations may also be used.

In order to insulate the side walls of a boxcar, such as boxcar 100, side panels, such as side panel 800, may be installed on all the exterior side surfaces of boxcar 100. In order to accomplish this objective, multiple side panels may be used to cover the exterior side surfaces of the boxcar. Any number of side panels may be used consistent with the invention.

Figure 11:
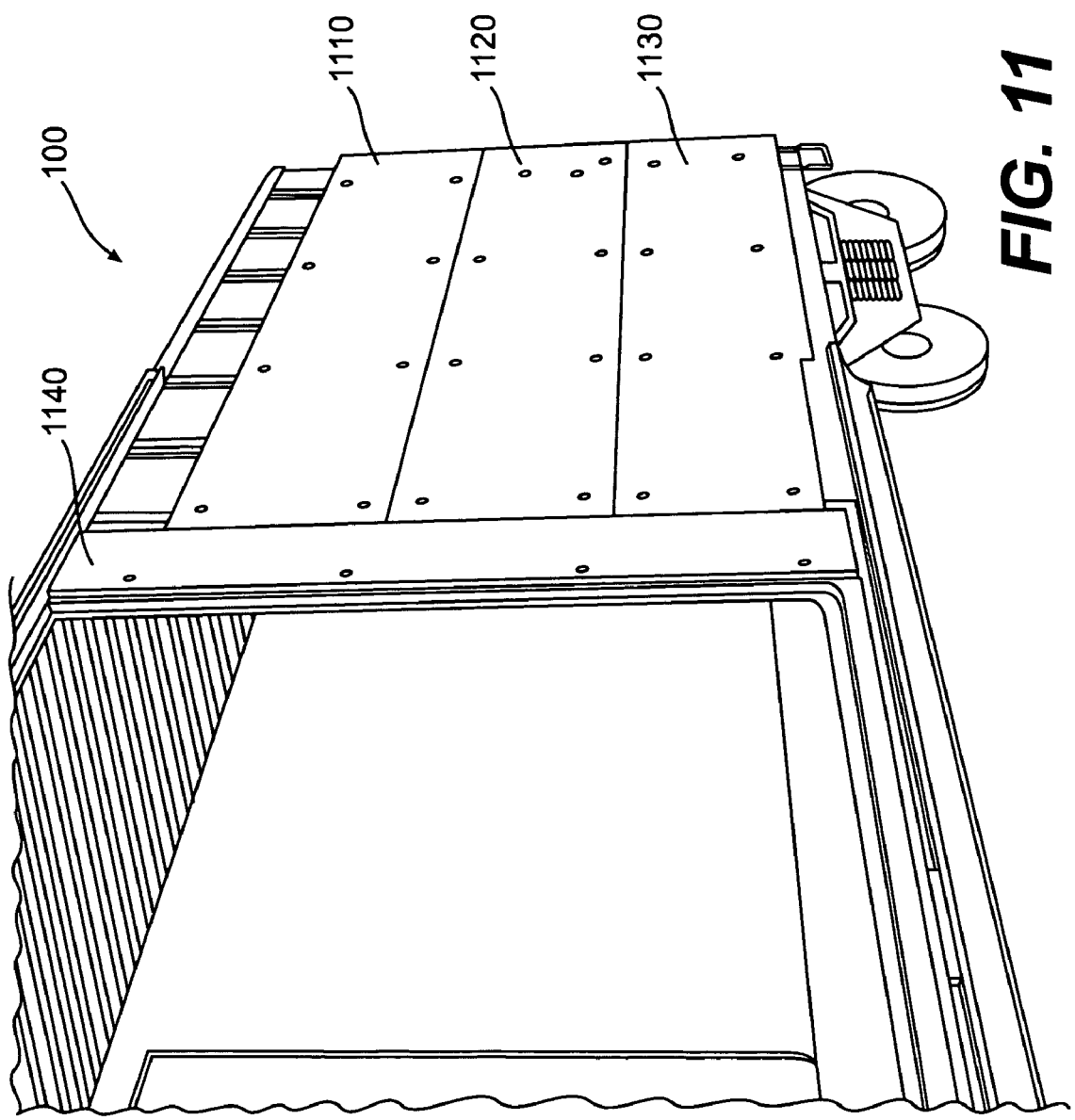
FIG. 11 is a schematic view of a portion of a boxcar with multiple side panels installed consistent with one embodiment of the invention.
Figure 12:
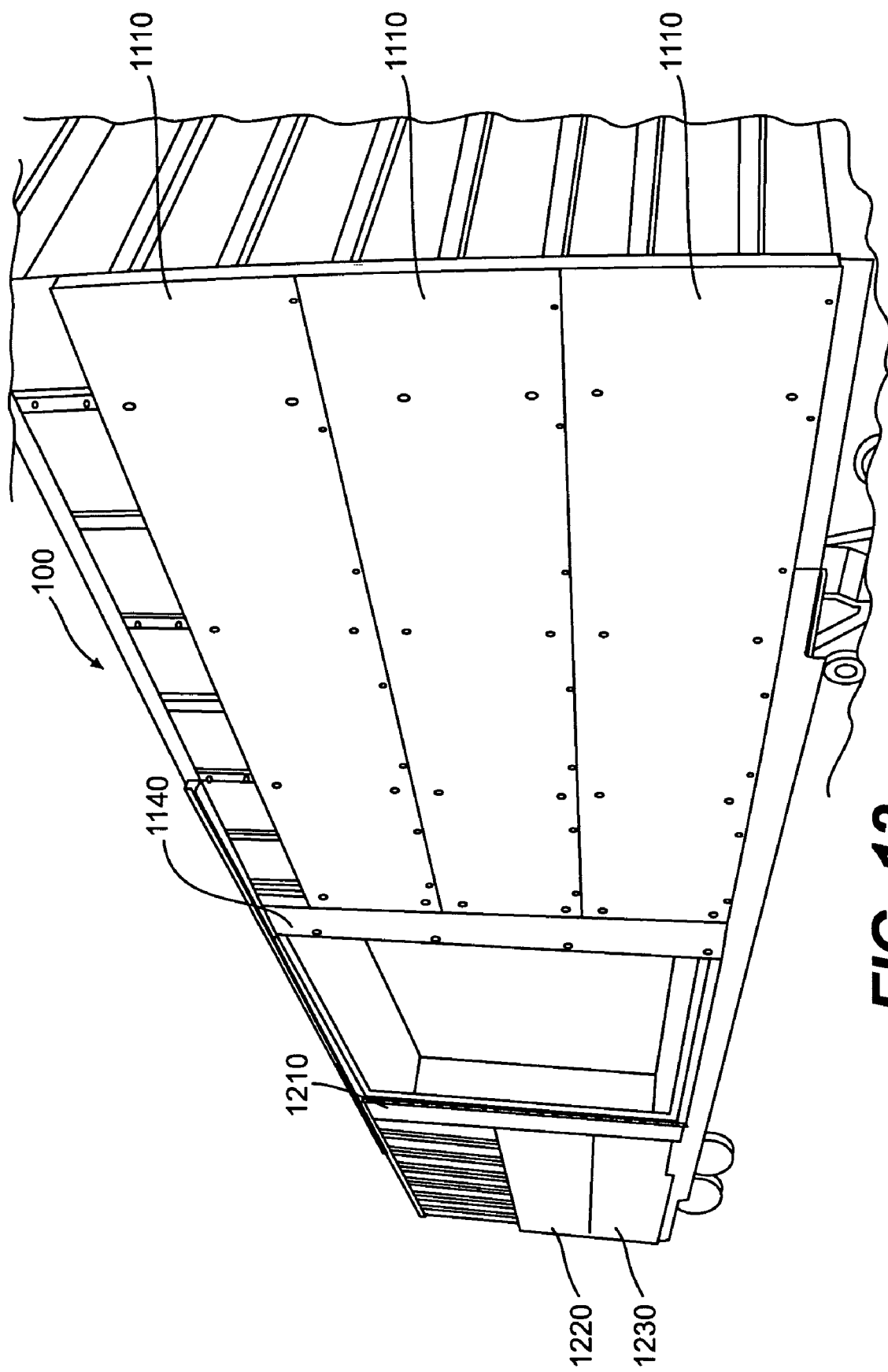
FIG. 12 is another schematic view of a portion of a boxcar with multiple side panels installed consistent with one embodiment of the invention.

FIGS. 11 and 12 are multiple schematic views of a portion of a boxcar with multiple side panels installed consistent with one embodiment of the invention. As shown in FIGS. 11 and 12, side panels 1110, 1120, 1130, 1140, 1210, 1220, and 1230 have been installed on boxcar 100. In one implementation, side panels 1110, 1120, 1130, 1140, 1210, 1220, and 1230 are constructed and attached to boxcar 100 using the methods described above. These implementations are merely exemplary, and other implementations may also be used.

In one implementation in which multiple side panels are used, the side panels will also include a mechanism by which the side panels may interlock with one another. In one implementation, each side panel will contain a plurality of slots on its edges. In this implementation, each slot will contain either a latch or catch to mate with a latch or catch in a slot on another side panel. In this implementation, end panels may be interlocked by mating a latch from one panel with a catch in a second panel. Examples of such mechanisms that may be used are the connectors disclosed in U.S. Pat. No. 3,353,314, the disclosure of which is expressly incorporated herein. This implementation is merely exemplary, and other implementations may also be used.

As shown in FIG. 2, following installation of the side panels, in one implementation, the next step is preparation of the end panels (step 218). In this step, end panels are constructed and prepared for installation. End panels are insulating panels that will be installed on the exterior surfaces of the end walls (such as end walls 140) of a boxcar (such as boxcar 100). The end panels of the present invention are of the same construction as the side panels discussed above, namely they are constructed of an outer skin on at least one face of an insulating layer. The outer skin and insulating layer are constructed from the same materials and in the same manner as discussed above for the side panels. This implementation is merely exemplary, and other implementations may also be used.

In one implementation, after construction of the end panels, portions of the end panels will be cutout to provide space for installation of appliances on the end panels of the rail car. Appliances are structures located at least partially on the exterior of the car such as ladders or air conditioners. The cutout may be in any shape suitable to install appliances. Examples of cutouts are further illustrated in the figures below. This implementation is merely exemplary, and other implementations may also be used.

As shown in FIG. 2, following preparation of the end panels, in one implementation, the next step is application of adhesive to the end panels (step 220). In this step, adhesive is applied to the end panels to adhere the end panels to the exterior surfaces of the end walls of a boxcar. In one implementation, the adhesive is of the same type and is applied in the same manner as the adhesive used to adhere the side panels (step 214). In one implementation, the adhesive is a structural adhesive such as Pliogrip 7700. These implementations are merely exemplary, and other implementations may also be used.

As shown in FIG. 2, following preparation of the end panels, in one implementation, the next step is application of adhesive to the end panels (step 220). In this step, adhesive is applied to the end panels to adhere the end panels to the exterior surfaces of the end walls of a boxcar. In one implementation, the adhesive is of the same type and is applied in the same manner as the adhesive used to adhere the side panels (step 214). In one implementation, the adhesive is a structural adhesive such as PLIOGRIP™ 7700. These implementations are merely exemplary, and other implementations may also be used.

Figure 13:
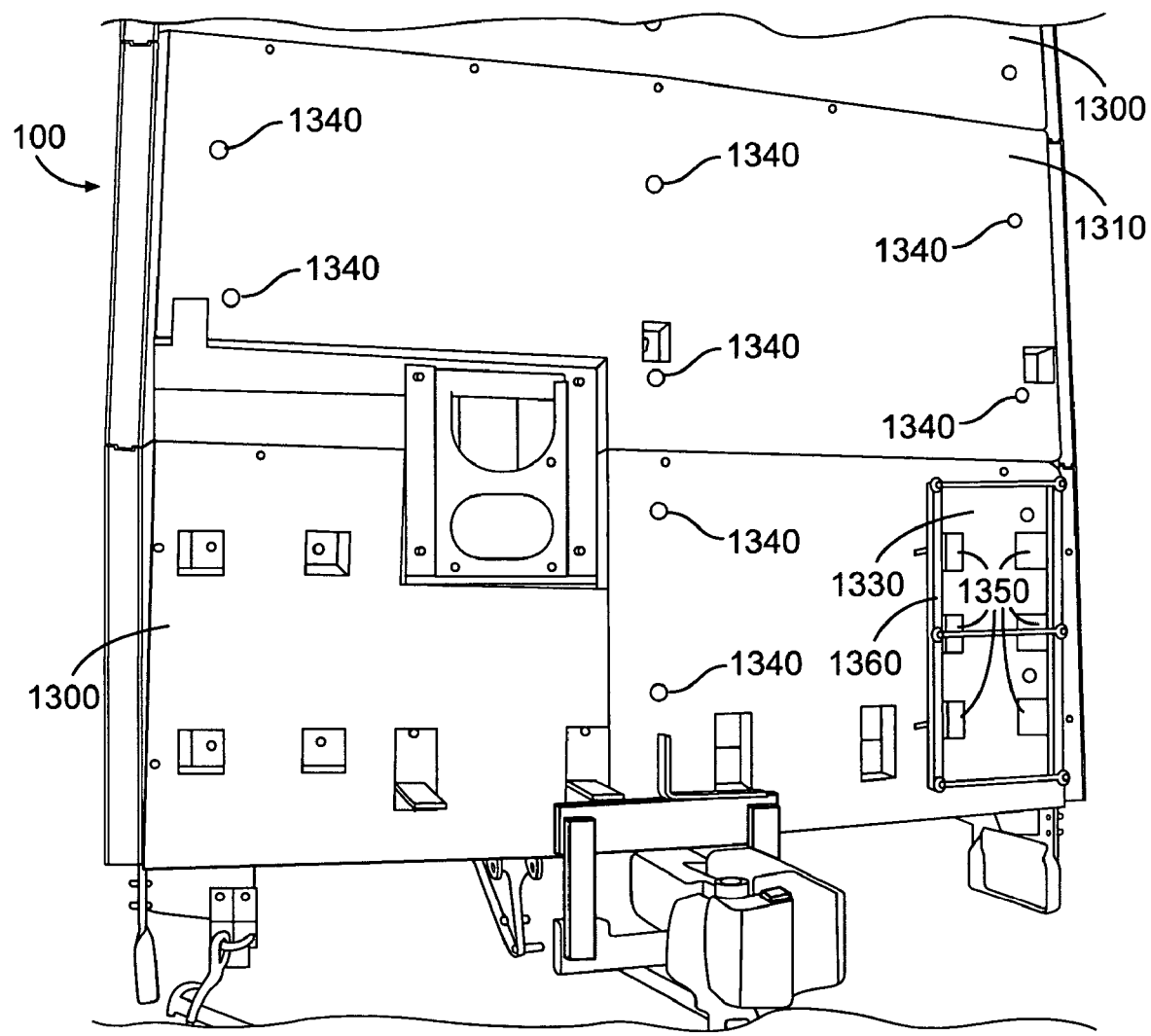
FIG. 13 is a schematic view of a portion of a boxcar end wall with multiple end panels installed consistent with one embodiment of the invention.
Figure 14:
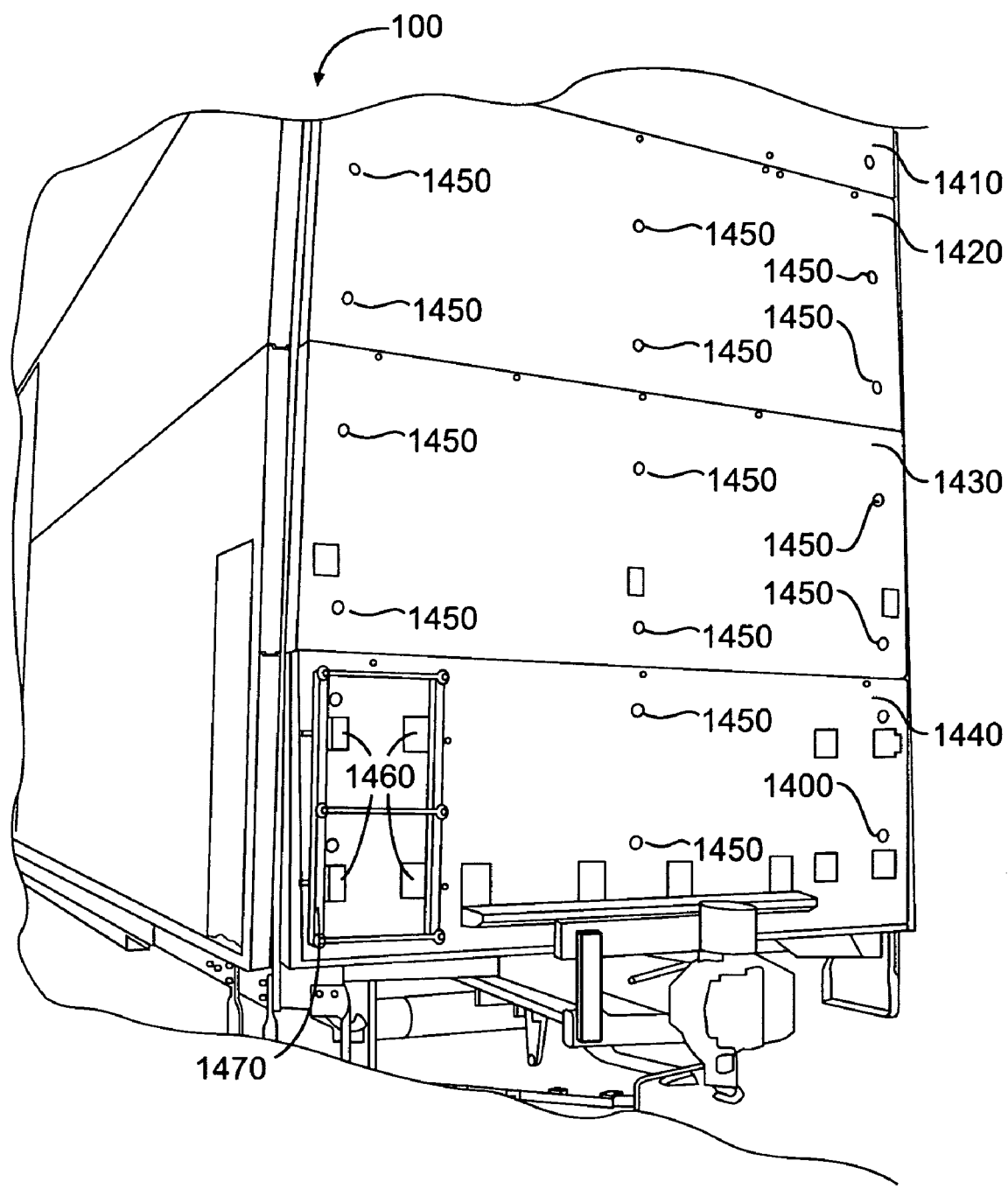
FIG. 14 is a schematic view of a portion of another boxcar end wall with multiple side panels installed consistent with one embodiment of the invention.

FIGS. 13 and 14 are two views of a portion of two boxcar end walls with multiple end panels installed consistent with one embodiment of the invention. As shown in FIGS. 13 and 14, end panels 1300, 1310, 1320, 1330, 1410, 1420, 1430, and 1440 have been adhered to boxcar 100. In one implementation, end panels 1300, 1310, 1320, 1330, 1410, 1420, 1430, and 1440 may be manually lifted into place. In another implementation, end panels 1300, 1310, 1320, 1330, 1410, 1420, 1430, and 1440 may be installed using a panel lifting device. These implementations are merely exemplary, and other implementations may also be used.

As described above, adhesive is used to attach end panels 1300, 1310, 1320, 1330, 1410, 1420, 1430, and 1440 to boxcar 100. In addition, mechanical fasteners may be used to further attach end panels 1300, 1310, 1320, 1330, 1410, 1420, 1430, and 1440 to boxcar 100. End panels 1300, 1310, 1320, 1330, 1410, 1420, 1430, and 1440 may also include mechanical fasteners to further attach the end panel to a boxcar. As shown in FIG. 13, mechanical fasteners are inserted in holes 1340 and 1450 in end panels 1300, 1310, 1320, 1330, 1410, 1420, 1430, and 1440 to attach end panels 1300, 1310, 1320, 1330, 1410, 1420, 1430, and 1440 to boxcar 100. In one implementation, the fasteners may include a washer, nut, and bolt, however, any fastener suitable for attaching end panels 1300, 1310, 1320, 1330, 1410, 1420, 1430, and 1440 to boxcar 100 may be used. These implementations are merely exemplary, and other implementations may also be used.

As also described above, and as shown in FIG. 13, cutouts 1350 and 1460 may be constructed in end panels 1300, 1310, 1320, 1330, 1410, 1420, 1430, and 1440 to allow for installation of appliances. For example, ladders 1360 and 1470 may be attached to boxcar 100 through cutouts 1350 and 1460. In one implementation, after installation of an appliance, a foam insulation may be used around cutouts 1350 and 1460 to further insulate the end walls. These implementations are merely exemplary, and other implementations may also be used.

As shown in FIGS. 13 and 14, multiple end panels, such as end panels 1300, 1310, 1320, 1330, 1410, 1420, 1430, and 1440 may be used to cover the exterior end surfaces of the boxcar. Any number of end panels may be used consistent with the invention. These implementations are merely exemplary, and other implementations may also be used.

In one implementation in which multiple end panels are used, the end panels may also include a mechanism by which the end panels may interlock with one another. In one implementation, each end panel will contain a plurality of slots on its edges. In this implementation, each slot will contain either a latch or catch to mate with a latch or catch in a slot on another end panel. In this implementation, end panels may be interlocked by mating a latch from one panel with a catch in a second panel. Examples of such mechanisms that may be used are the connectors disclosed in U.S. Pat. No. 3,353,314, the disclosure of which is expressly incorporated herein. This implementation is merely exemplary, and other implementations may also be used.

As shown in FIG. 2, following installation of the end panels, in one implementation, the next step is installation of appliances (step 224). In this step, side panels and/or end panels are prepared for installation of appliances. In addition, in this step, those appliances are installed on the boxcar. In one implementation, appliances include fixtures attached to the exterior surface of a boxcar, such as, for example, a side ladder pan. In this implementation, this step may include shaping of the side panel or end panel to enable the side panel or end panel to receive an appliance. Further, in this implementation, installation of the appliances may include affixing the appliances to an end panel or side panel using adhesives, mechanical fasteners, or any combination thereof. These implementations are merely exemplary, and other implementations may also be used.

Figure 15:
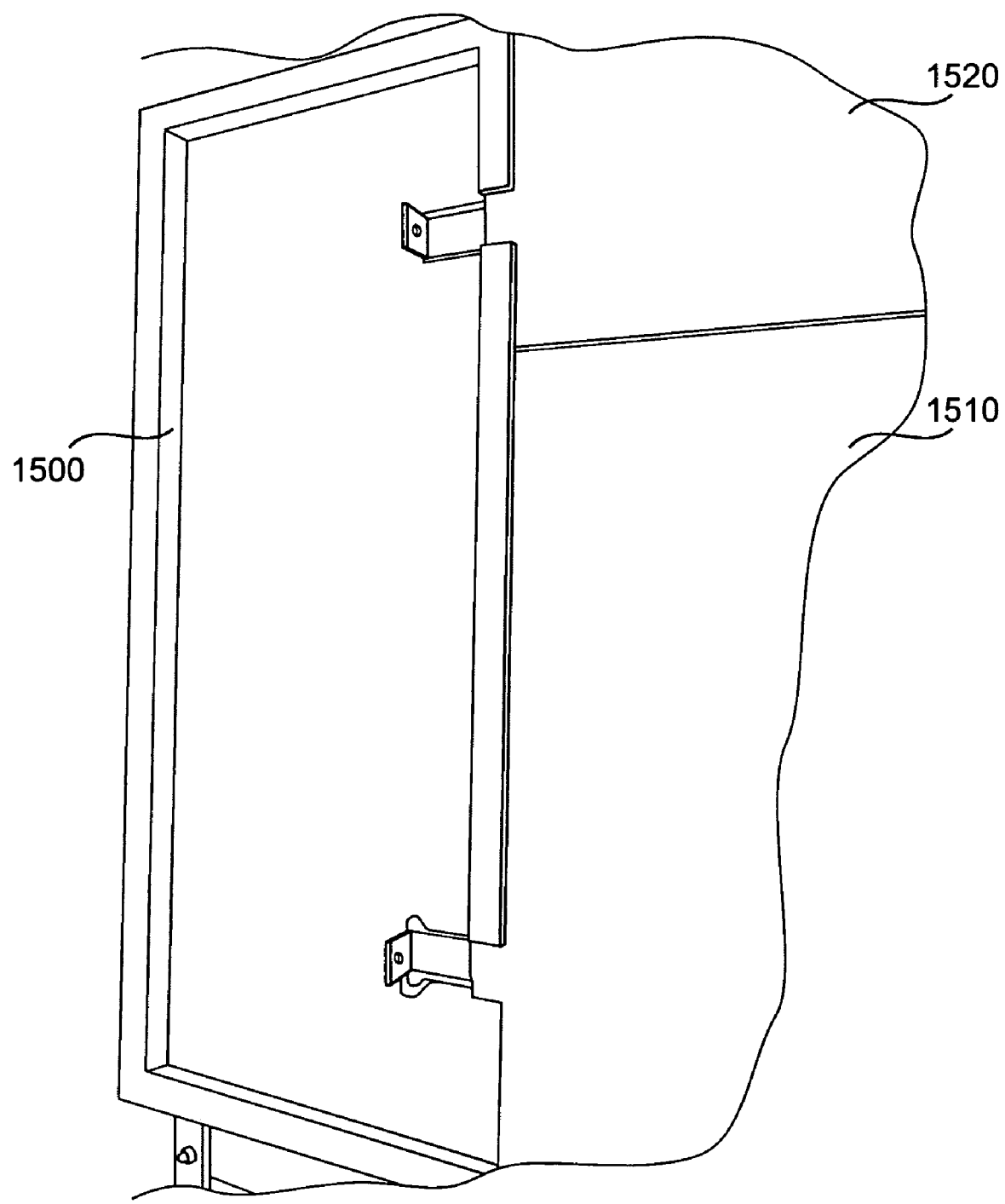
FIG. 15 is a schematic view of a portion of a side panel with an appliance installed thereto consistent with an embodiment of the invention.

FIG. 15 is a schematic view of a portion of a side panel with an appliance installed thereto consistent with an embodiment of the invention. As shown in FIG. 15, an appliance, a side ladder pan 1500, has been installed on side panels 1510, and 1520 of boxcar 100. In one implementation, prior to installation of side ladder pan 1500, a portion of side panels 1510 and 1520 in the area of side ladder pan 1500 is shaped to create an indentation in side panel 1510. Side ladder pan 1500 may then be installed in the indentation in side panel 1510. It should be understood that FIG. 15 illustrates one example of installation of an appliance, and other appliances may be installed in any suitable location on the exterior surfaces of the boxcar. These implementations are merely exemplary, and other implementations may also be used.

It should be appreciated that at this stage of the manufacturing process, the end walls and wall panels of the boxcar have been substantially covered by insulated panels. In addition, the floor has been modified to include additional insulating members. In addition, appliances have been installed on the end panels and side panels.

As shown in FIG. 2, following installation of additional appliances, in one implementation, the next step is preparation of roof panels (step 226). In this step, roof panels are constructed and prepared for installation. Roof panels are insulating panels that will be installed on the exterior surfaces of the roof (such as roof 120) of a boxcar (such as boxcar 100). In one implementation, the roof panels of the present invention are of the same construction as the side panels and end panels discussed above, namely they are constructed of an outer skin on at least one face of an insulating layer. In this implementation, the outer skin and insulating layer are constructed from the same materials and in the same manner as discussed above for the side and end panels. These implementations are merely exemplary, and other implementations may also be used.

Figure 16:
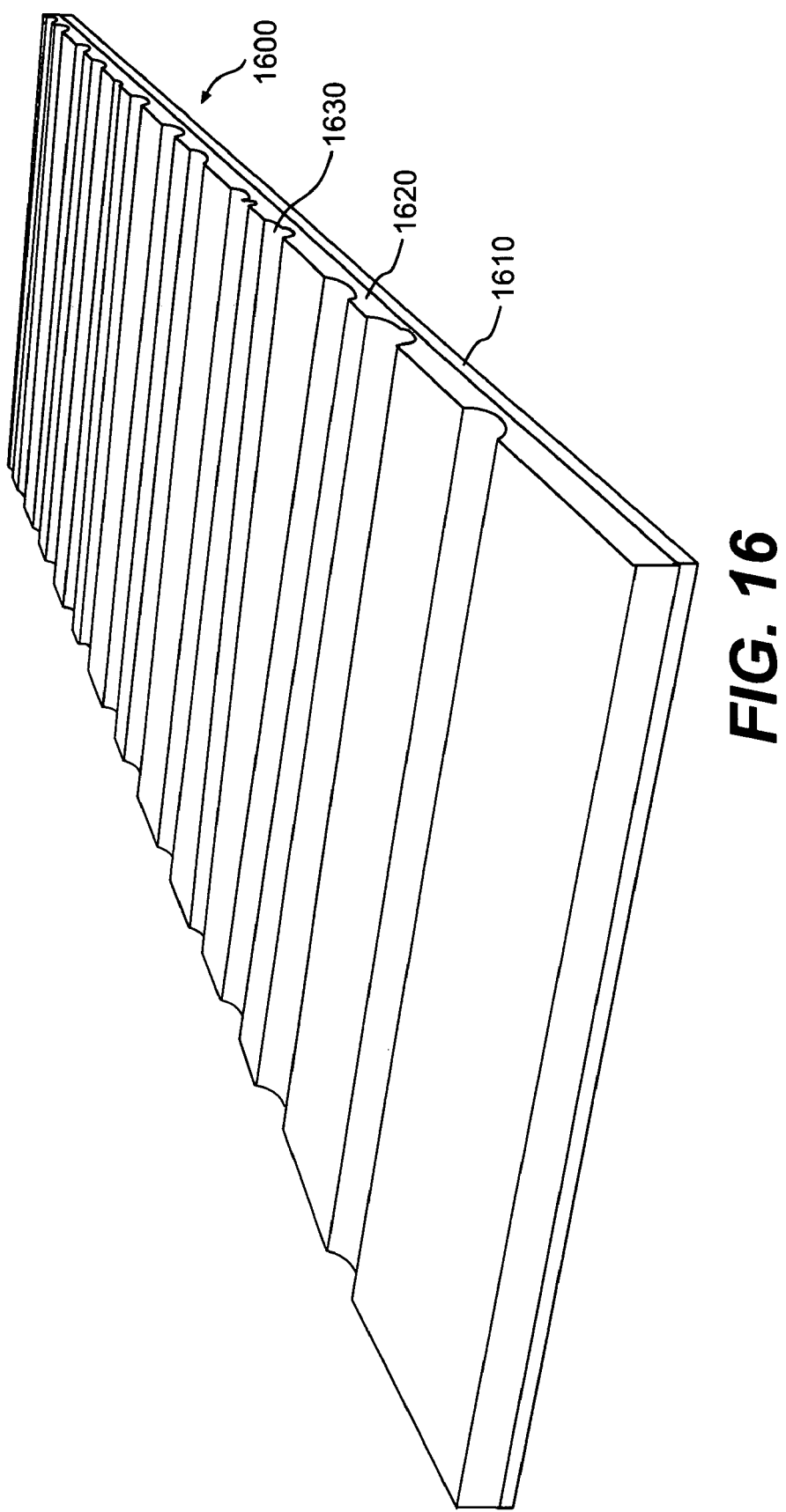
FIG. 16 is a top perspective view of a roof panel consistent with one embodiment of the invention.

FIG. 16 is a top perspective view of a roof panel consistent with one embodiment of the invention. As shown in FIG. 16, a roof panel 1600 is an insulated panel constructed of an outer skin 1610 and an insulating layer 1620. In addition, roof panel 1600 is constructed in a shape such that it may be overlaid on an exterior surface of the roof a boxcar. Therefore, in one implementation, as shown in FIG. 16, roof panel 1600 includes indentations 1630 so that roof panel 1600 can fit over protrusions on the exterior surfaces of the roof of the boxcar. This implementation is merely exemplary, and other implementations may also be used.

Figure 17:
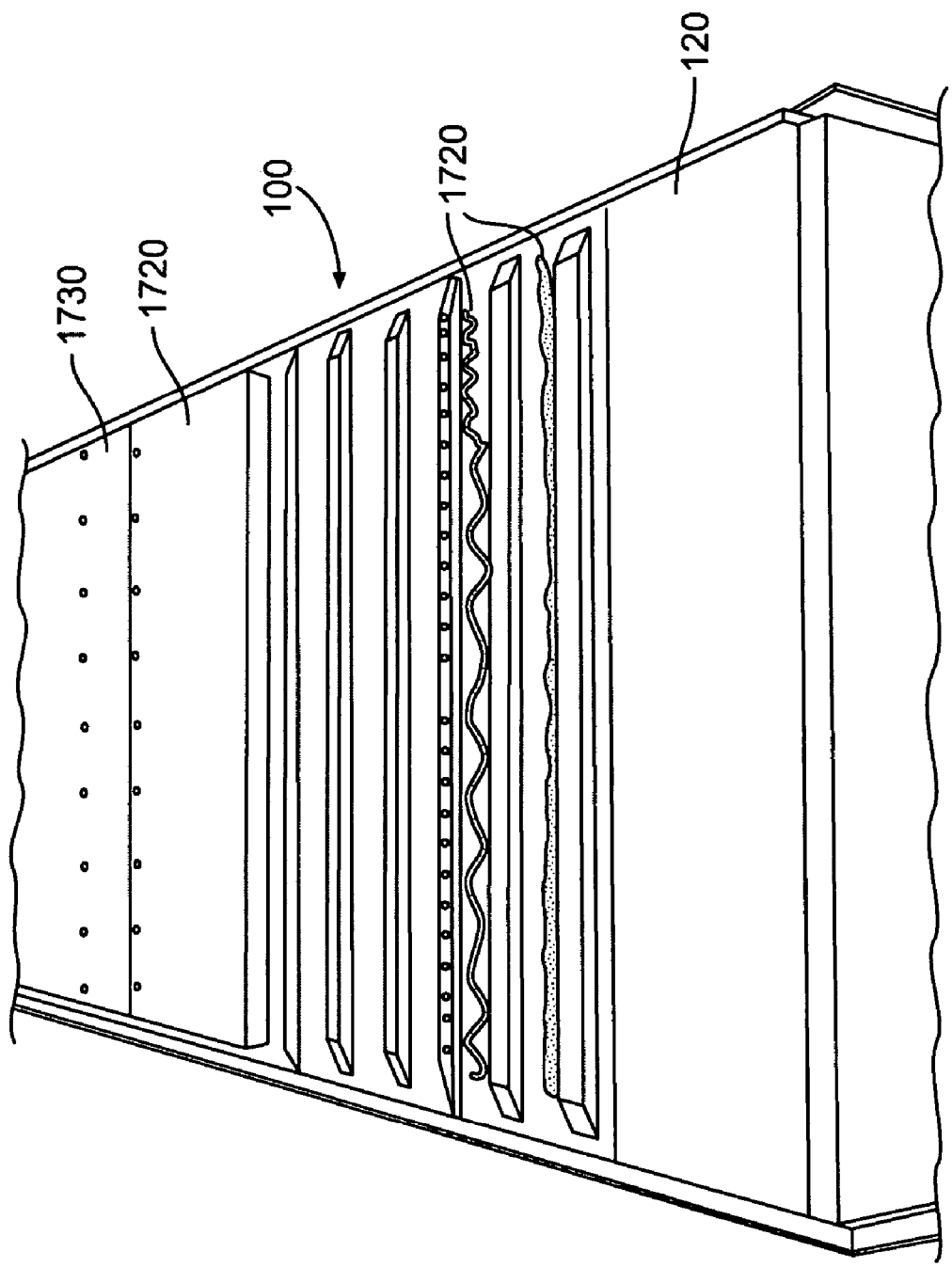
FIG. 17 is a schematic view of a portion of a boxcar roof with roof panels installed and adhesive applied thereto consistent with one embodiment of the invention.

As shown in FIG. 2, following preparation of the roof panels, in one implementation, the next step is application of adhesive to the roof of the boxcar (step 228). In this step, adhesive is applied to the roof to adhere the roof panels to the exterior surfaces of the roof of a boxcar. In one implementation, the adhesive is of the same type and is applied in the same manner as the adhesive used to adhere the side panels and end panels (steps 214 and 220). In one implementation, the adhesive is a structural adhesive such as Pliogrip 7700. FIG. 17 is a schematic view of a portion of a boxcar roof with roof panels installed and adhesive applied thereto consistent with one embodiment of the invention. As shown in FIG. 17, adhesive 1710 is applied to roof 120 of boxcar 100. As can be further seen in FIG. 17, two roof panels 1720 and 1730 have been applied to boxcar 100. This implementation is merely exemplary, and other implementations may also be used.

As shown in FIG. 2, following preparation of the roof panels, in one implementation, the next step is application of adhesive to the roof of the boxcar (step 228). In this step, adhesive is applied to the roof to adhere the roof panels to the exterior surfaces of the roof of a boxcar. In one implementation, the adhesive is of the same type and is applied in the same manner as the adhesive used to adhere the side panels and end panels (steps 214 and 220). In one implementation, the adhesive is a structural adhesive such as PLIOGRIP™ 7700. FIG. 17 is a schematic view of a portion of a boxcar roof with roof panels installed and adhesive applied thereto consistent with one embodiment of the invention. As shown in FIG. 17, adhesive 1710 is applied to roof 120 of boxcar 100. As can be further seen in FIG. 17, two roof panels 1720 and 1730 have been applied to boxcar 100. This implementation is merely exemplary, and other implementations may also be used.

As described above, adhesive is used to adhere roof panel 1800 to boxcar 100. In addition, mechanical fasteners may be used to further attach roof panel 1800 to boxcar 100. Roof panel 1800 may also include mechanical fasteners to further attach the end panel to a boxcar. In one implementation, the fasteners may include a washer, nut, and bolt, however, any fastener suitable for attaching roof panel 1800 to boxcar 100 may be used. These implementations are merely exemplary, and other implementations may also be used.

Figure 18:
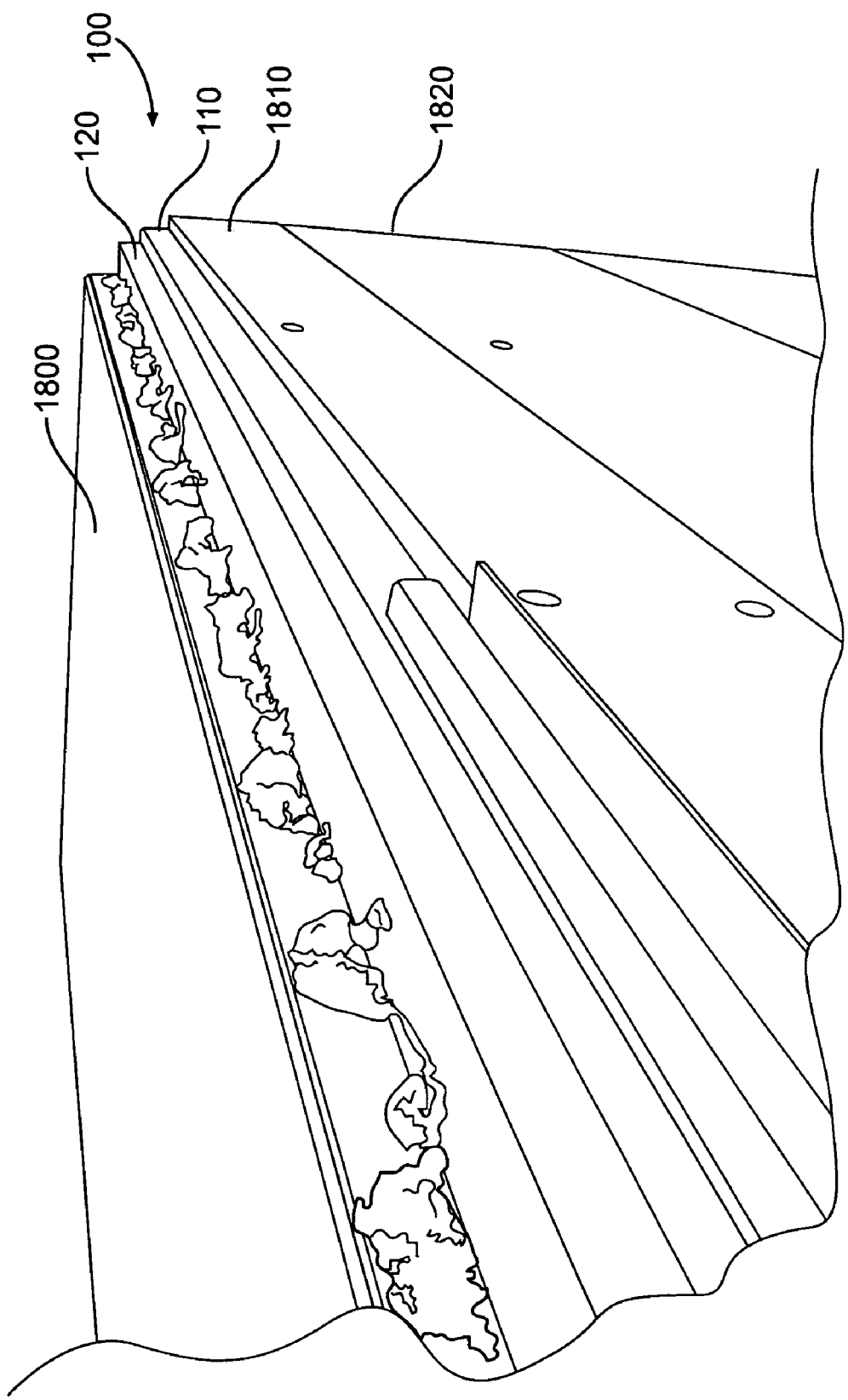
FIG. 18 is another schematic view of a portion of a boxcar with roof panels installed consistent with one embodiment of the invention.

As shown in FIG. 18, in one implementation, foam 1820 may also be placed in roof panel 1800. After installation of roof panel 1800, some gaps may exist between roof 120 of boxcar 100 and roof panel 1800. Therefore, foam 1820 is used to fill these gaps and provide greater insulation to boxcar 100. Foam 1820 may be any type of insulating foam including urethane. These implementations are merely exemplary, and other implementations may also be used.

In addition, while only one roof panel is shown in FIG. 18, multiple roof panels may be used to cover the exterior surface of the roof of the boxcar. Any number of roof panels may be used consistent with the invention. These implementations are merely exemplary, and other implementations may also be used.

In one implementation in which multiple roof panels are used, the roof panels will also include a mechanism by which the roof panels may interlock with one another. In one implementation, each roof panel will contain a plurality of slots on its edges. In this implementation, each slot will contain either a latch or catch to mate with a latch or catch in a slot on another roof panel. In this implementation, roof panels may be interlocked by mating a latch from one panel with a catch in a second panel. Examples of such mechanisms that may be used are the connectors disclosed in U.S. Pat. No. 3,353,314, the disclosure of which is expressly incorporated herein. This implementation is merely exemplary, and other implementations may also be used.

After installation of the roof panels, end panels, and side panels as described above, the exterior surfaces of the boxcar are mostly covered with insulating panels. In one implementation, however, certain portions of the boxcar may remain uncovered. For example, as is apparent in FIG. 18, a portion of boxcar 100 at the intersection of roof 120 and side wall 110 is uncovered. Therefore, as shown in FIG. 2, following installation of the roof panels, in one implementation, the next step is installation of closures (step 232) to enclose some or all of these uncovered portions. Closures are objects designed to cover exposed portions of a boxcar thereby increasing the insulation of the boxcar and providing a uniform appearance. Closures may be constructed in any shape and of any material suitable to cover an exposed portion of a boxcar. In one implementation, closures are constructed of pultruded composites. These implementations are merely exemplary, and other implementations may also be used.

In one implementation, each closure is attached to one or more of the panels (such as end panels, side panels, or roof panels described above). Examples of closures such as this are described in more detail below with respect to FIGS. 19-25. These implementations are merely exemplary, and other implementations may also be used.

Figure 19:
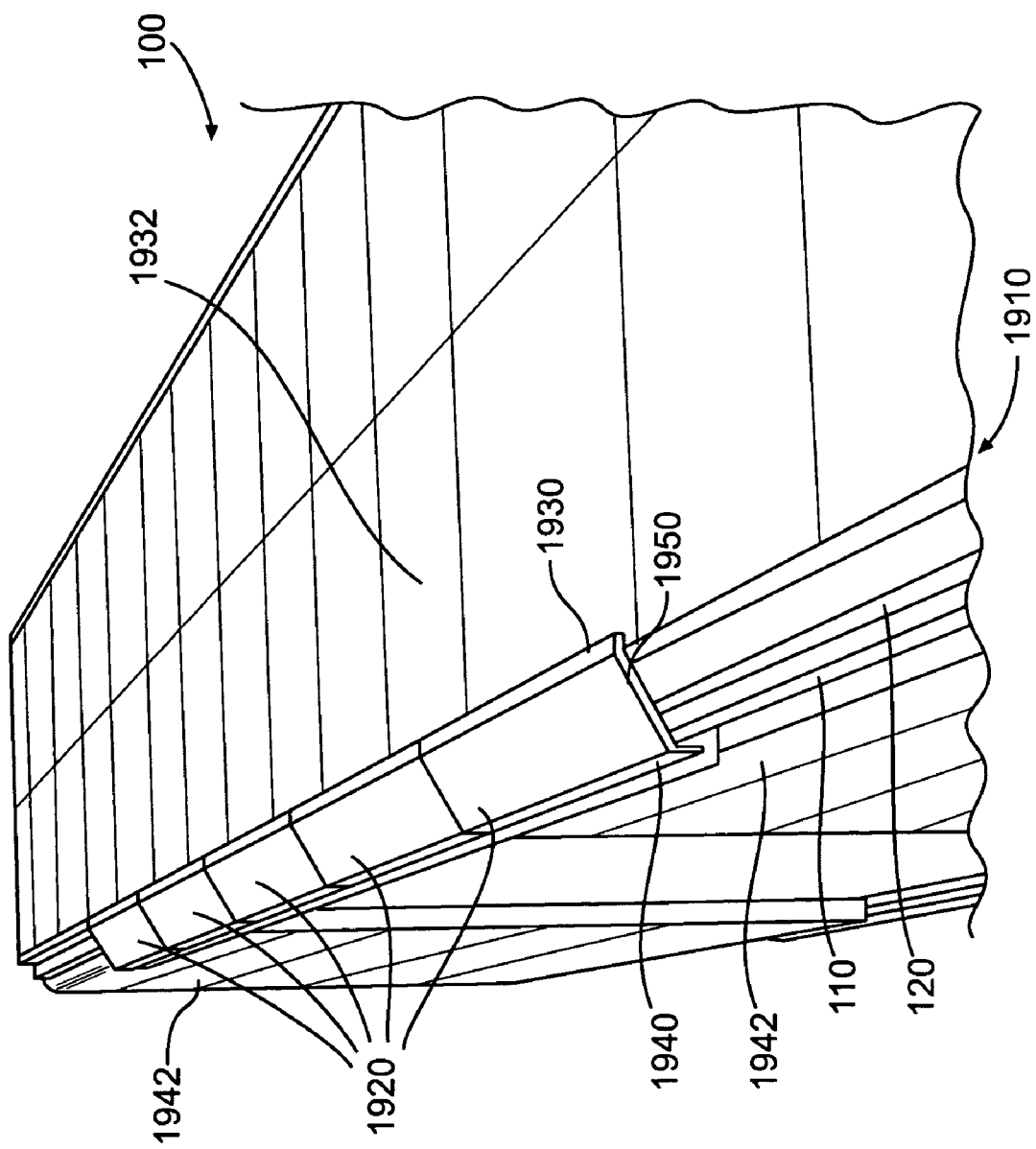
FIG. 19 is a schematic view of a portion of a boxcar with roof closures installed consistent with one embodiment of the invention.
Figure 20:
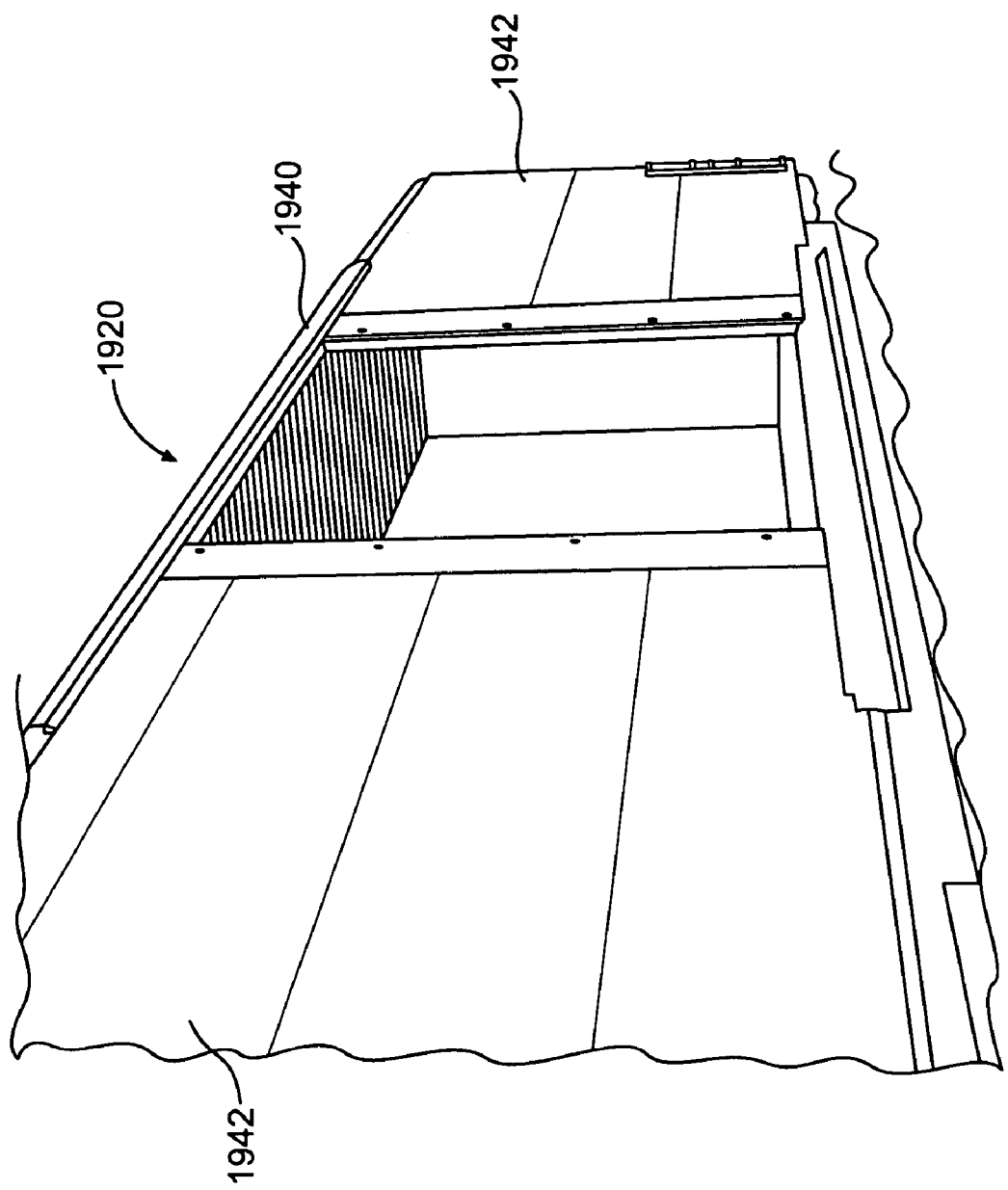
FIG. 20 is another schematic view of a portion of a boxcar with roof closures installed consistent with one embodiment of the invention.

FIGS. 19-25 illustrate multiple schematic views of a boxcar with various closures installed consistent with one embodiment of the invention. As shown in FIG. 19, after installation of roof panels 1932 and side panels 1942, edge portion 1910 of box car 100 located at the intersection of roof 120 and side walls 110 of boxcar 100 remains uncovered. In one implementation, roof closures 1920 are installed to cover edge portion 1910. Roof closures 1920 are objects designed to cover edge portion 1910 and to protect the insulation and edges of the insulated panels. These implementations are merely exemplary, and other implementations may also be used.

In one implementation, as shown in FIG. 19-22, roof closures 1920 comprise a horizontal flange 1930, which connects to roof panel 1932, a vertical flange 1940, which connects to side panel 1942, and a pultruded shape 1950 extending between horizontal flange 1930 and vertical flange 1940. As shown in FIG. 19, roof closures 1920 are attached to roof panel 1932 and side panel 1942. In one implementation, roof closures 1920 are adhered to roof panel 1932 and side panel 1942 using a structural adhesive. In another implementation, roof closures 1920 are attached by welding or using mechanical fasteners. In one implementation, roof closures 1920 are constructed of pultruded composites. In another implementation, roof closures are constructed of a skin containing pultruded plastics such as fiber reinforced plastics. These implementations are merely exemplary, and other implementations may also be used.

Figure 21:
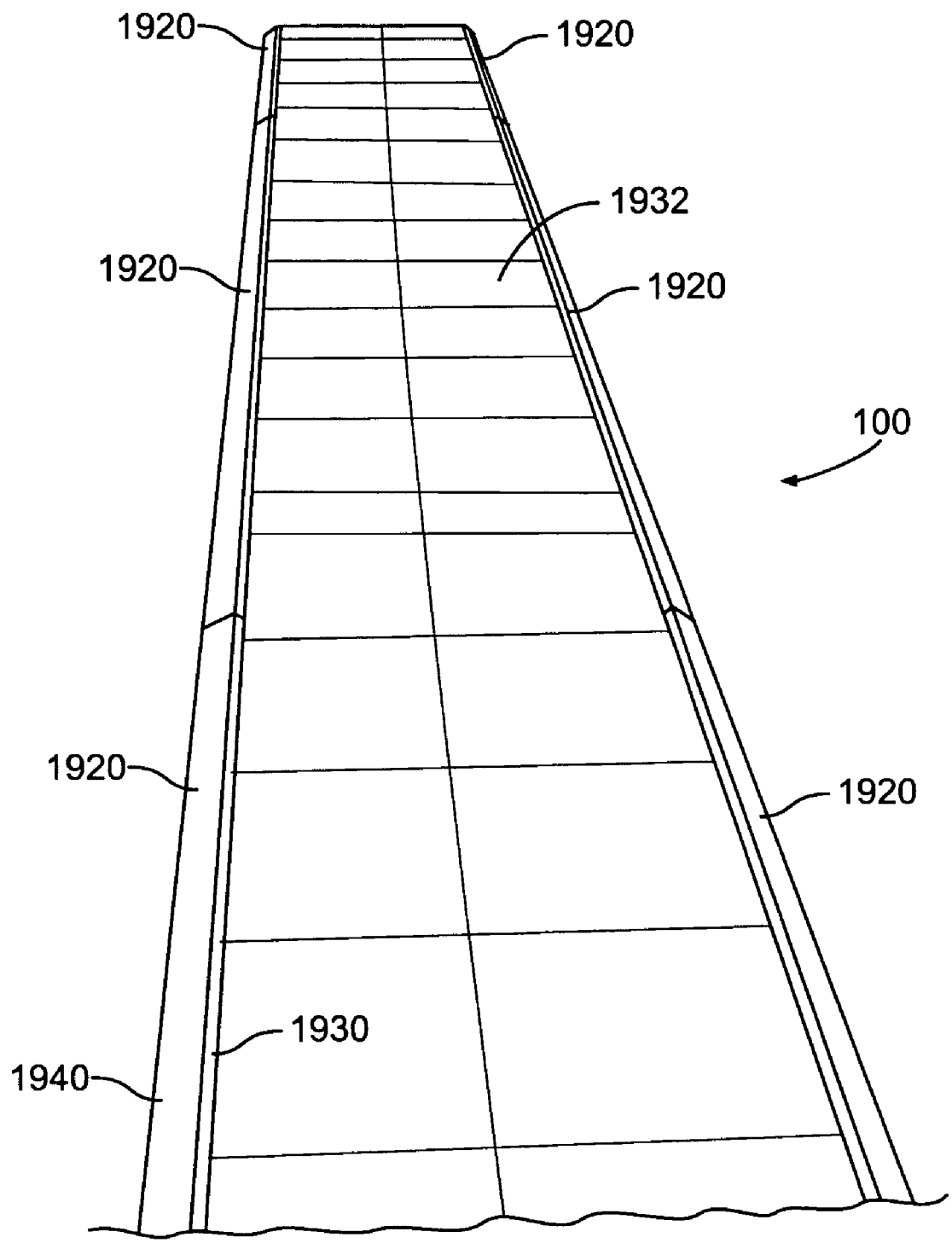
FIG. 21 is a schematic view of a portion of a boxcar roof with roof closures installed consistent with one embodiment of the invention.
Figure 22:
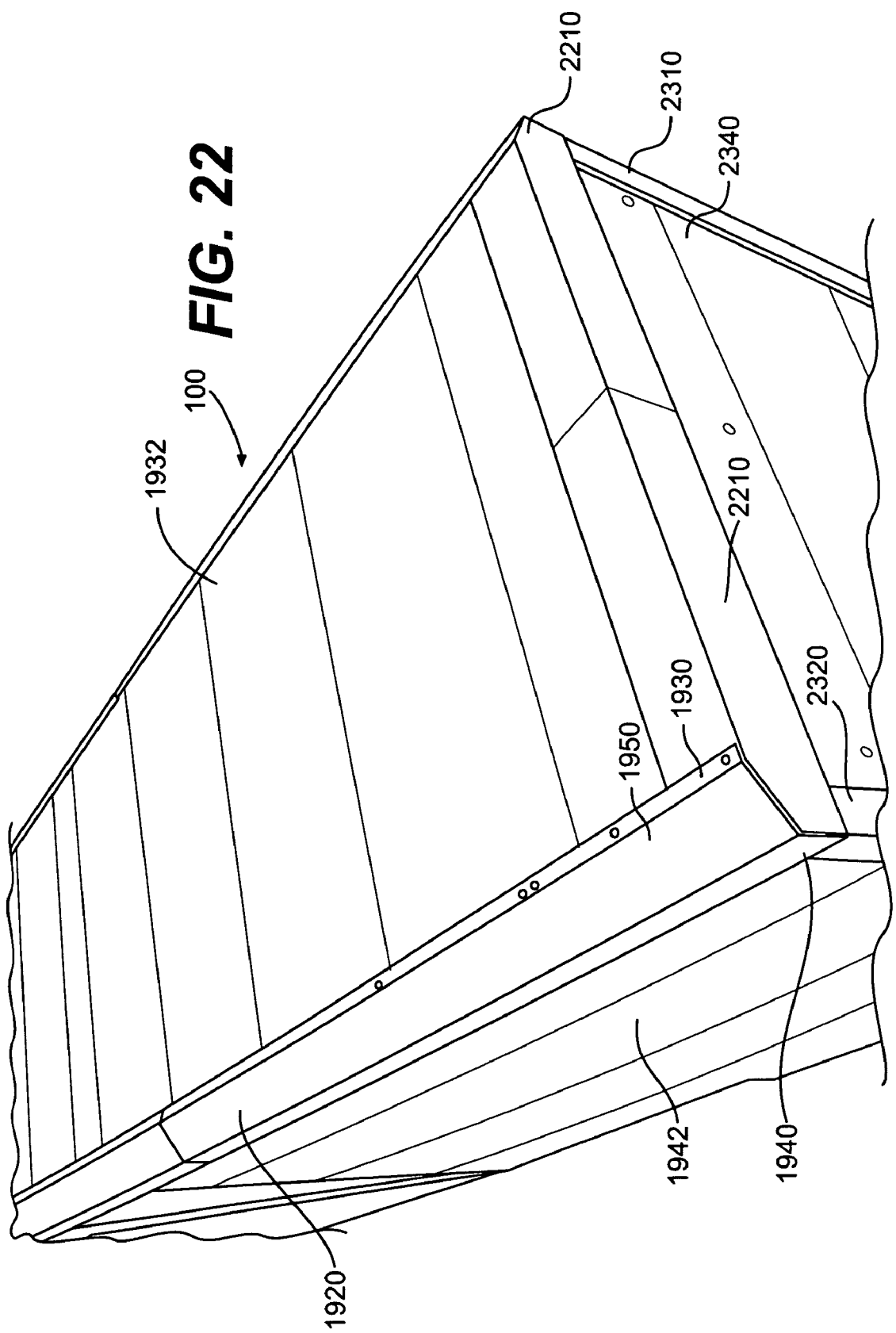
FIG. 22 is a schematic view of a portion of a boxcar with roof closures and end wall closures installed consistent with one embodiment of the invention.

As shown in FIGS. 21-22, in one implementation, multiple roof closures 1920 are used to cover edge portion 1910. This implementation is merely exemplary, however, any number of roof closures 1920 may be used. For example, roof closures 1920 may be designed with a greater or lesser length thereby decreasing or increasing the number of roof closures 1920 needed to cover edge portion 1920. These implementations are merely exemplary, and other implementations may also be used.

In addition to installation of a roof closure, as described above, other closures may also be installed on other uncovered portions of the boxcar. For example, closures may also be installed to cover the intersections of end walls and side walls, the intersections of end walls and the roof, the intersections of side walls and the floor, the intersection of end walls and the floor of a boxcar, and the intersection of side walls and the floor of a boxcar.

Figure 23:
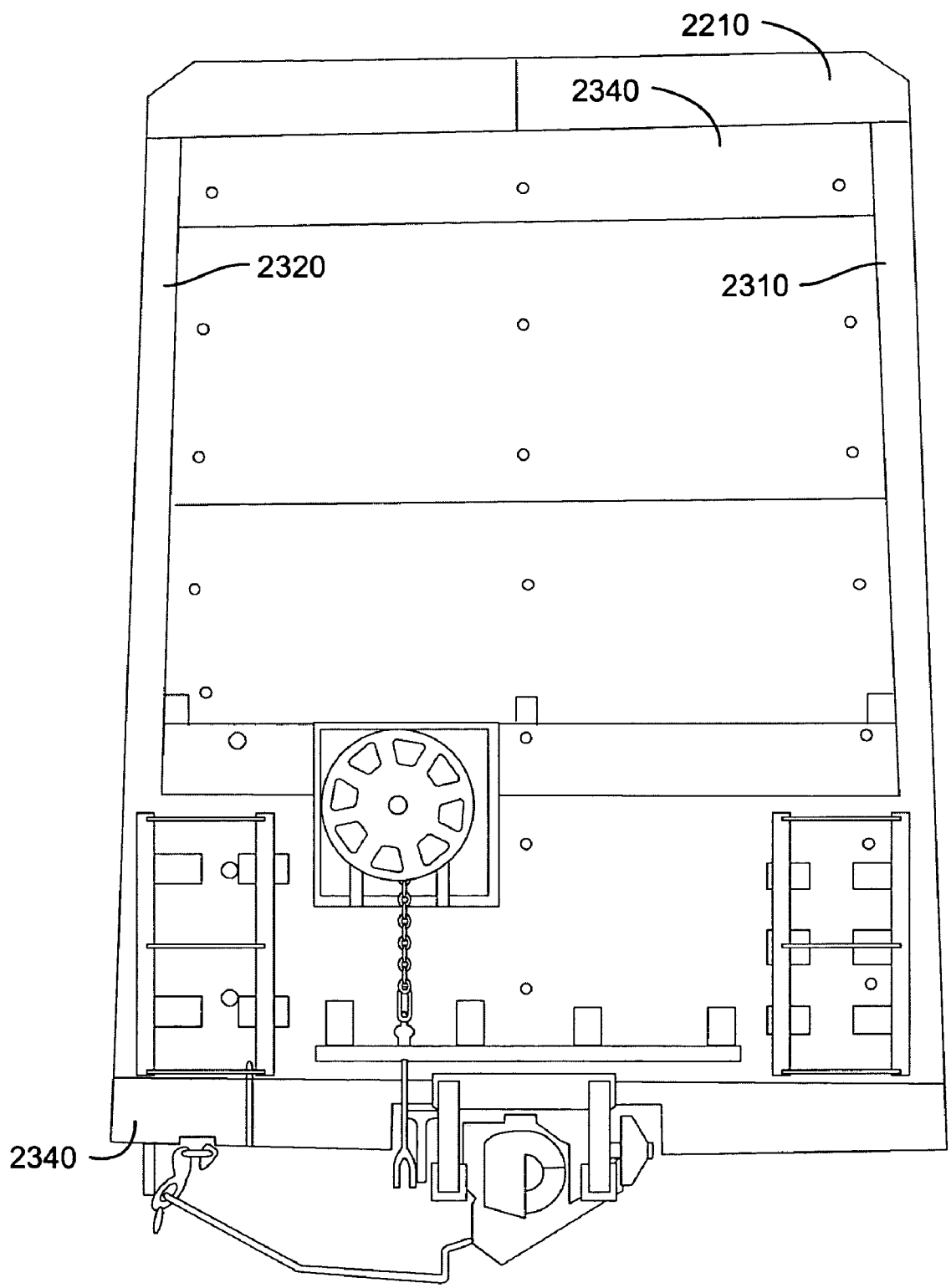
FIG. 23 is a schematic view of an end wall of a boxcar with end wall closures installed consistent with one embodiment of the invention.

FIGS. 22 and 23 are multiple schematic views of a boxcar with roof closures and end wall closures installed consistent with one embodiment of the invention. As shown in FIGS. 22 and 23 roof closures 1920 have been installed on a boxcar as described above. In addition, end wall closures 2210, 2310, 2320, and 2330 have also been installed on boxcar 100. End wall closures 2210, 2310, 2320, and 2330 are panels designed to cover exposed portions located on the end wall of boxcar 100. As shown in FIGS. 22 and 23, end wall closure 2210 covers the intersection of the end wall and the roof and is attached to end wall panels 2340 and roof panel 1932; end wall closures 2310 and 2320 cover the intersections of the end wall and side walls and are attached to end wall panels 2340 and side panels 1942, and end wall closure 2330 covers the intersection of the floor and end wall and is attached to floor panel and end wall panels 2340. In one implementation, end wall closures 2210, 2310, 2320, and 2330 are constructed of pultruded composites. In one implementation, end wall closures 2210, 2310, 2320, and 2330 are adhered to these panels using a structural adhesive. In another implementation, end wall closures 2210, 2310, 2320, and 2330 may be attached to the panels by welding or using mechanical fasteners. These implementations are merely exemplary, and other implementations may also be used.

Figure 24:
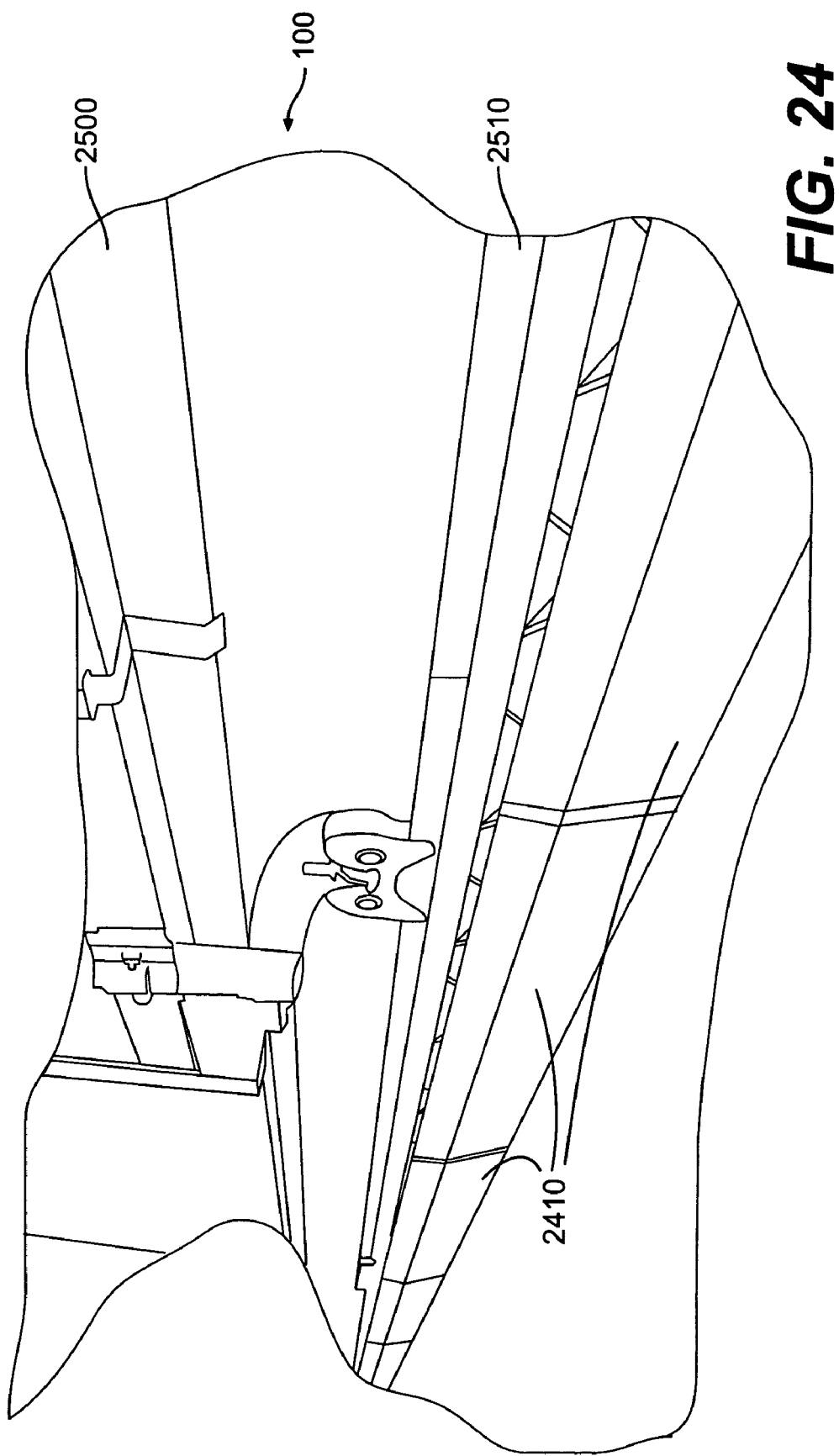
FIG. 24 is a schematic view of a portion of a boxcar with floor closures installed consistent with one embodiment of the invention.
Figure 25:
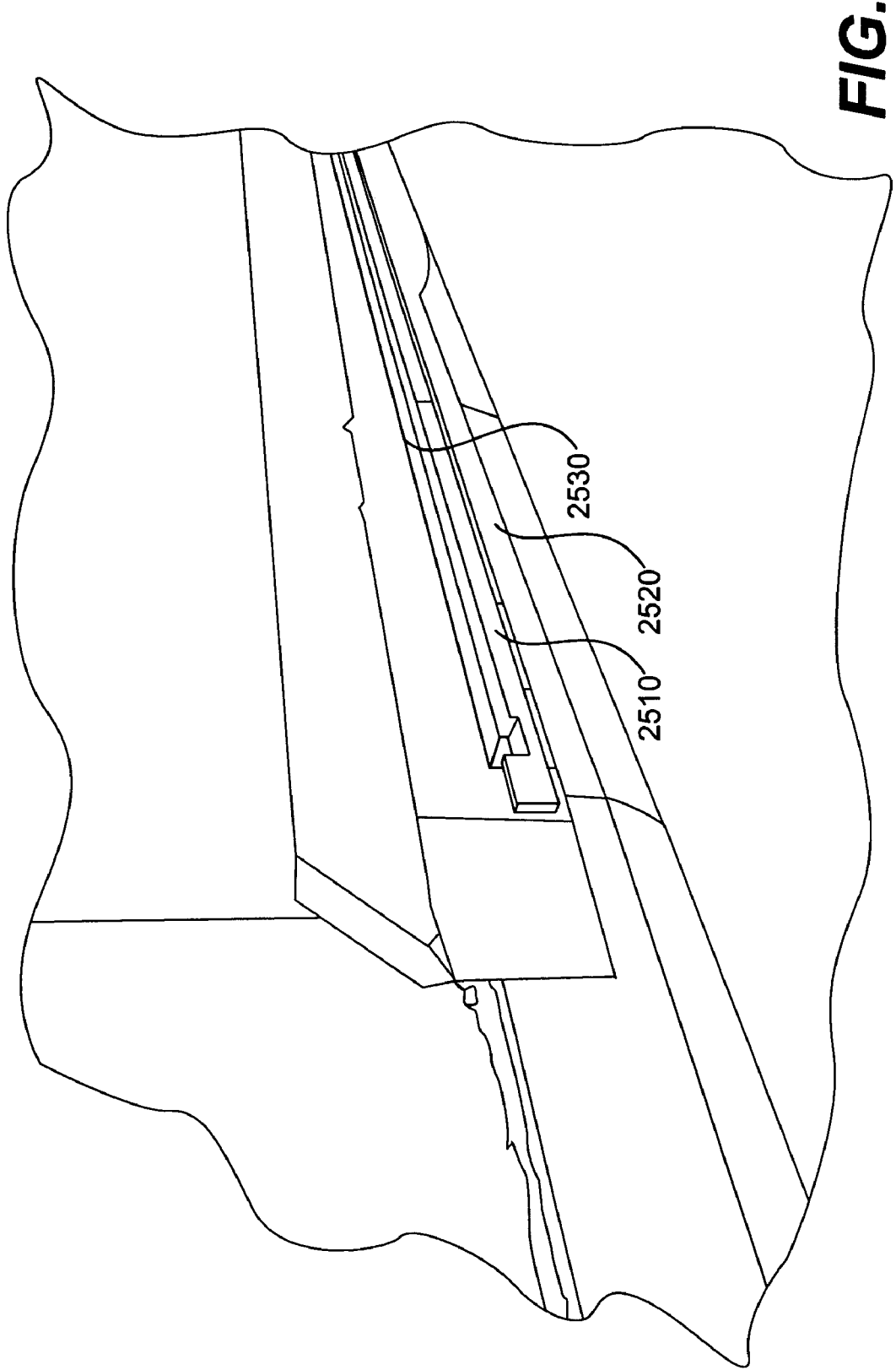
FIG. 25 is a schematic view of a portion of a boxcar with door track closures installed consistent with one embodiment of the invention.

FIGS. 24 and 25 are multiple schematic views of a portion of a boxcar with floor closures and door track closures installed consistent with one embodiment of the invention. As shown in FIGS. 24 and 25, floor closures 2410 have been installed on boxcar 100. Floor closures 2410 are panels designed to cover exposed portions of the under frame of boxcar 100 at the intersection of the side walls and the floor. In one implementation, floor closures 2410 are constructed of pultruded composites. In one implementation, floor closures 2410 may be adhered to these panels using a structural adhesive. In another implementation, floor closures 2410 may be attached to the panels by welding or using mechanical fasteners. These implementations are merely exemplary, and other implementations may also be used.

In addition, as shown in FIG. 25, door track closures 2520 have also been installed on boxcar 100. As shown in FIGS. 24-25, in one implementation, door track 2510 of boxcar 100 may also be exposed. Door track 2510 is a track for the door 2500 of boxcar 100. Door 2500 slides on door track 2510 to allow for door 2500 to be opened or closed. While door track 2510 needs to be exposed to allow for door 2500 to slide in door track 2510, door track closures 2520 may be installed to cover the area below door track 2510. Door track closures 2520 are attached to the outer surface of the boxcar. In one implementation, door track closures 2520 are constructed of pultruded composites. In one implementation, door track closures 2520 are adhered to these panels using a structural adhesive. In another implementation, floor closures 2410 are attached to the panels by welding or using mechanical fasteners. These implementations are merely exemplary, and other implementations may also be used.

In yet another implementation, insulating members 2530 are installed between the outer surface of the boxcar and door track 2510 to reduce thermal conductivity from door track 2510. In one implementation, insulating members 2530 have a generally four-sided-shape cross-section and extend longitudinally. For example, insulating members 2530 may have a parallelogram-shaped cross-section, a rectangular-shaped cross-section, a round cross-section, or a square-shaped cross section. Insulating members 2530 may be the same length as, shorter than, or longer than the door track to which they are attached. Insulating members 2530 may also be one continuous member or may comprise multiple members attached at various points to the boxcar. In one implementation, insulating members 2530 are constructed by pultrusion from fiber-reinforced plastics and are attached to structural members with a structural adhesive, such as PLIOGRIP™ 7700. These implementations are merely exemplary and other implementations may also be used. For example, insulating members with generally U or I-shaped cross sections may be used. In addition, other means of attaching insulating members 2530 may be used such as bolts or other mechanical fasteners. These implementations are merely exemplary and other implementations may also be used.

As shown in FIG. 2, following installation of the closures, in one implementation, the next step is installation of door stops (step 234). In this step, door stops are installed on door tracks, (such as door track 2510 in FIG. 25) to prevent the doors of boxcar 100 from sliding past certain desired points on door track 2510. Door stops may be constructed in any shape and from any material suitable to prevent a door from sliding on door track 2510 past the location of the door stop. In one implementation (as described below), boxcar 100 will have two doors on each side of the boxcar, wherein to open the doors, each door slides along door 2510 in the direction of the ends of the boxcar. In this implementation, four door stops are located on door track 2510. One door stop is located near the end of door track 2510 closest to one end panel and a second door stop is located near the end of door track 2510 closest to the opposing end panel. The two remaining door stops are located near the center of door track 2510 such that when both doors are slid to the closed positions, they will abut these two door stops. This implementation is merely exemplary, and other implementations may also be used.

Figure 26:
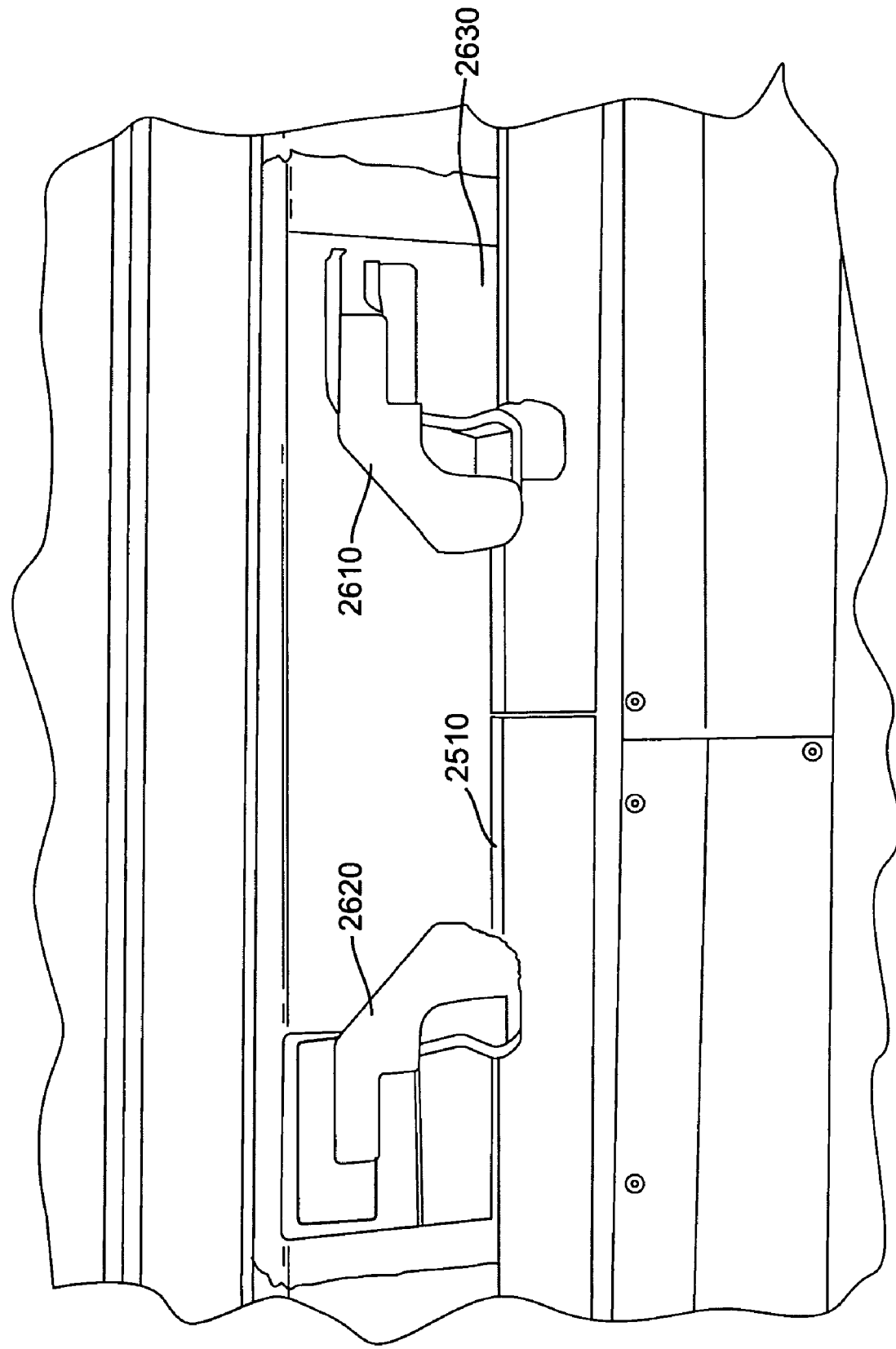
FIG. 26 is a schematic view of a portion of a door track of a boxcar with center door stops installed consistent with one embodiment of the invention.

FIG. 26 is a schematic view of a portion of a door track of a boxcar with center door stops installed consistent with one embodiment of the invention. As shown in FIG. 26, door stops 2610 and 2620 have been installed on door track 2510. As further shown in FIG. 26, in one implementation, foam insulation 2630 has been installed in the area around door stop 2610 to further insulate boxcar 100. In this implementation, foam insulation may be any suitable foam insulator such as urethane foam. These implementations are merely exemplary, and other implementations may also be used.

After installation of the closures, substantially all of the exterior surfaces of the boxcar are covered with insulating panels or closures. One exterior surface that remains uncovered, however, is the underside of the floor of the boxcar. Due to the structure of the floor of the boxcar, installing insulating panels may not be practical on the underframe of the boxcar. Therefore, as shown in FIG. 2, following installation of the door stops, in one implementation, the next step is application of foam insulation (step 236) to the underframe of the boxcar. Foam insulation may be any type of foam insulation such as urethane foam. In addition, foam insulation may be applied to any gaps between insulating panels or closures and the boxcar to further improve thermal efficiency.

Figure 27:
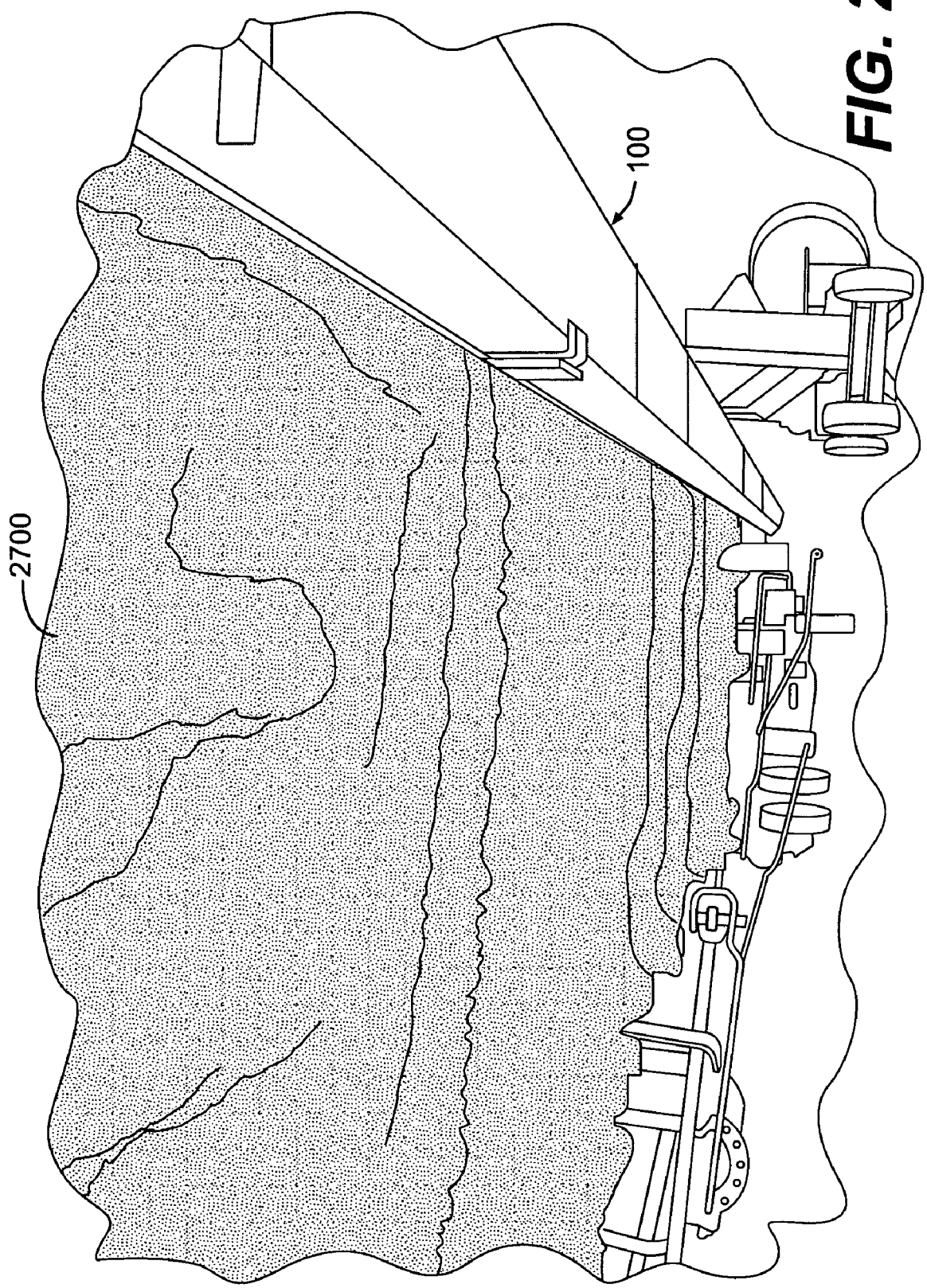
FIG. 27 is a schematic view of a portion of the underside of a boxcar with foam insulation applied thereto consistent with one embodiment of the invention.

FIG. 27 is a schematic view of a portion of the underside of a boxcar with foam insulation applied thereto consistent with one embodiment of the invention. As shown in FIG. 27, foam insulation 2700 has been blown on to the underframe of boxcar 100. In one implementation, foam insulation 2700 covers substantially all of the underframe of boxcar 100. In another implementation, a release agent may be applied to the underframe prior to installation of the foam. The release agent will allow sections of the foam insulation to be cut away without affecting other areas of the foam. Any suitable release agent may be used, such as a silicone based release agent. These implementations are merely exemplary, and other implementations may also be used.

As shown in FIG. 2, following application of the foam insulation, in one implementation, the next step is installation of the doors (step 238). In this step, doors are installed on the boxcar to provide a means to open or close access to the enclosed space in the boxcar.

Figure 28:
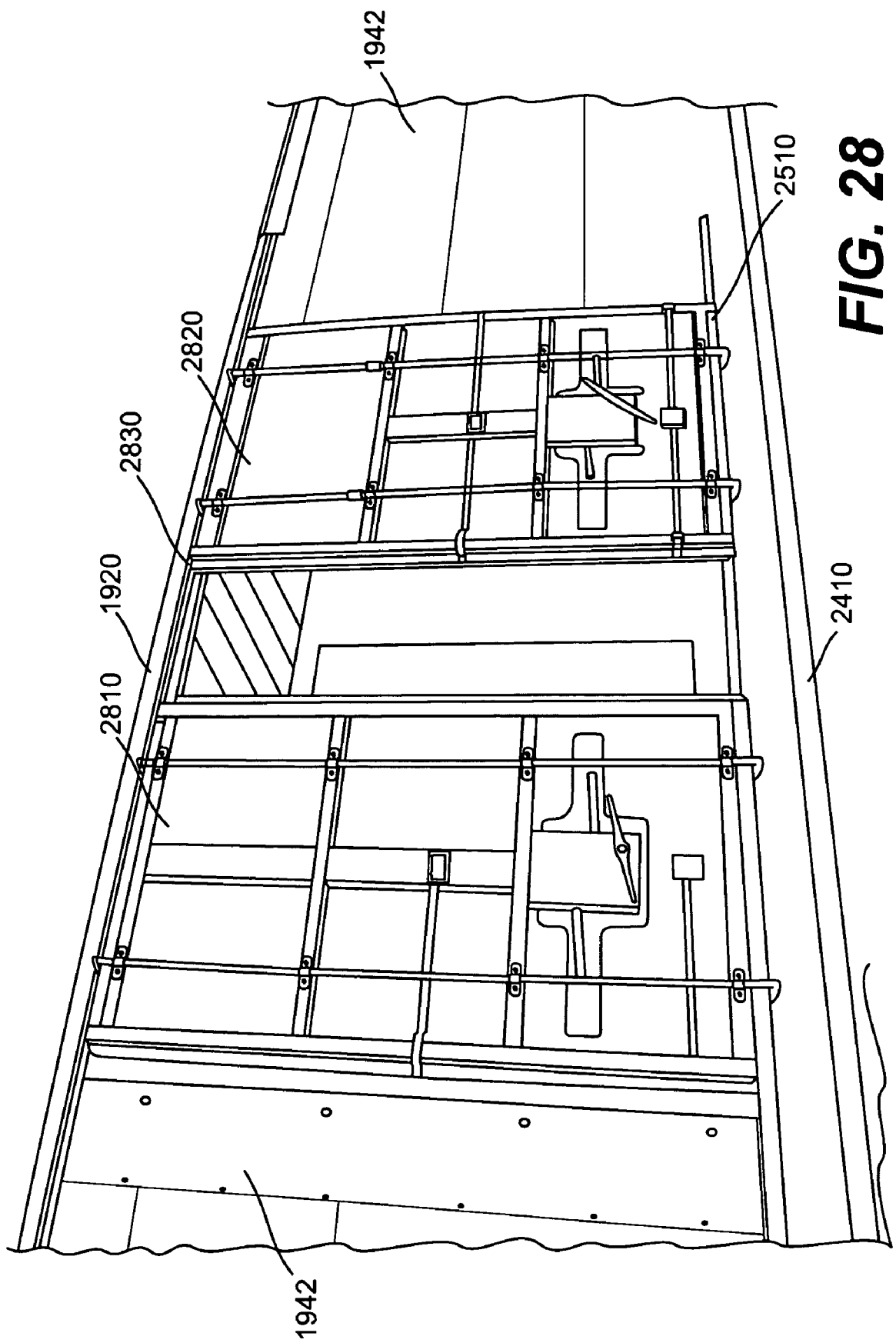
FIG. 28 is a schematic view of a portion of a boxcar with doors installed consistent with one embodiment of the invention.

FIG. 28 is a schematic view of a portion of a boxcar with doors installed consistent with one embodiment of the invention. As shown in FIG. 28, in one implementation, boxcar 100 includes two doors 2810 and 2820 on boxcar 100. In one implementation, similar door would be included on the opposing side of boxcar 100. Doors 2810 and 2820 may be of any shape and construction suitable to act as a door for a boxcar. For example, doors 2810 and 2820 may be plug doors of the type typically used on boxcars. In one implementation, doors 2810 and 2820 are the doors located on boxcar 100 prior to the application of the method of the invention. In another implementation new doors may be constructed for boxcar 100. In one implementation, doors 2810 and 2820 will also include accessories such as locks and handles. These implementations are merely exemplary, and other implementations may also be used.

As described above, boxcar 100 includes door track 2510. Boxcar 100 also includes a door track 2830 located near the roof of boxcar 100. In one implementation, door track 2830 is similar in construction and operation to door track 2510. As shown in FIG. 28, doors 2810 and 2820 are installed on door tracks 2510 and 2830. In order to open or close doors 2810 and 2820 the doors slide on door tracks 2510 and 2830 along the length of the boxcar. Doorstops, such as those described above, provide limits on the movement of doors 2810 and 2820. Doors 2810 and 2830 may be installed using any well-known method. These implementations are merely exemplary, and other implementations may also be used.

As shown in FIG. 2, following installation of the doors, in one implementation, the next step is insulation of the doors (step 240). In this step, insulation is applied to the interior surfaces of the doors of a boxcar. In one implementation, an insulated panel, such as those used for the side panels, end panels, and roof panels described above may be installed on the interior surfaces of the doors. In another implementation, foam insulation will be installed on the doors of the boxcar. In one implementation, after application of the foam, a fiber reinforced polymer skin will be applied over the foam insulation. These implementations are merely exemplary, and other implementations may also be used.

Figure 29:
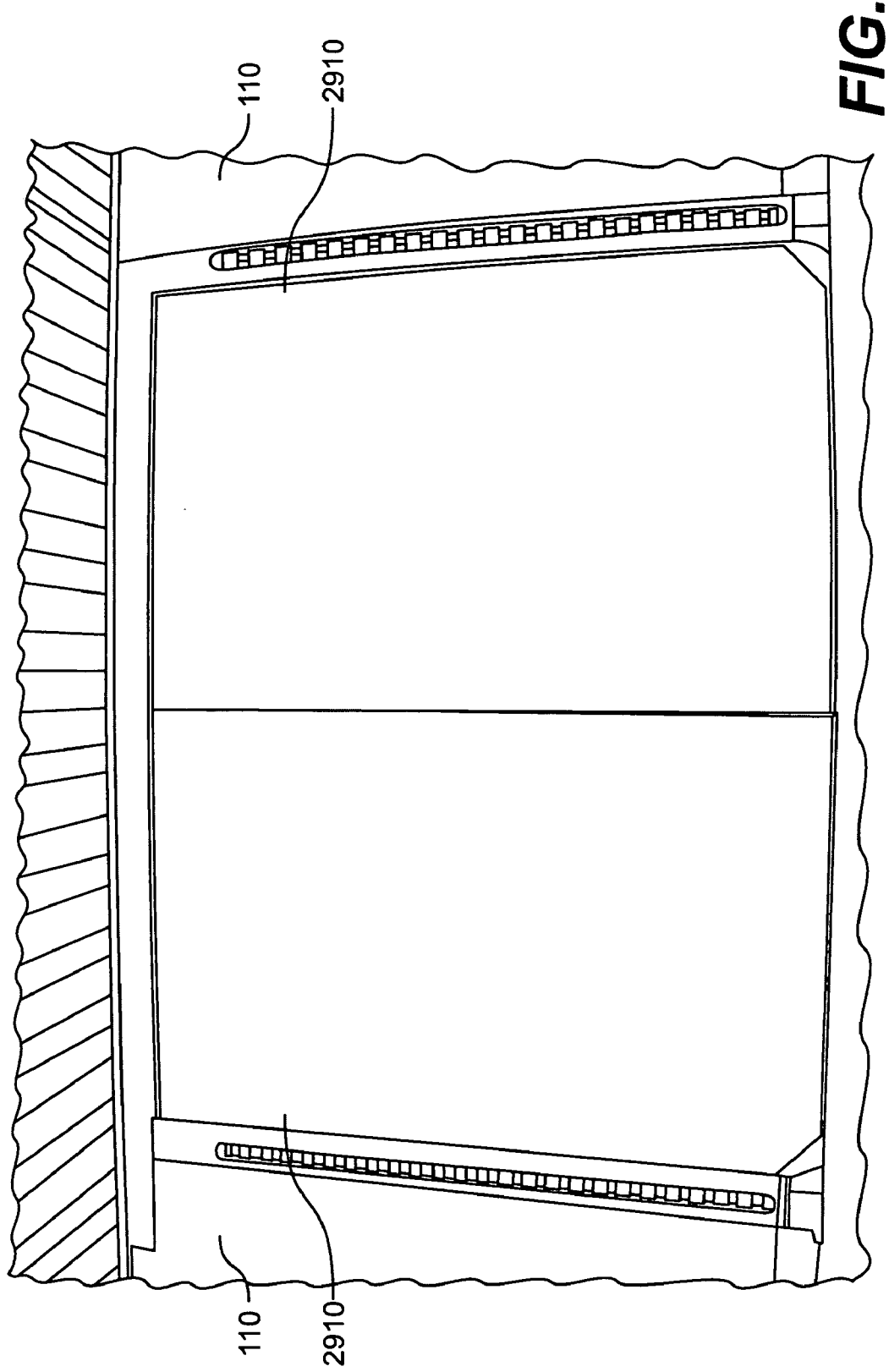
FIG. 29 is a schematic view of a portion of a boxcar with insulated panels installed on the boxcar doors consistent with one embodiment of the invention.
Figure 30:
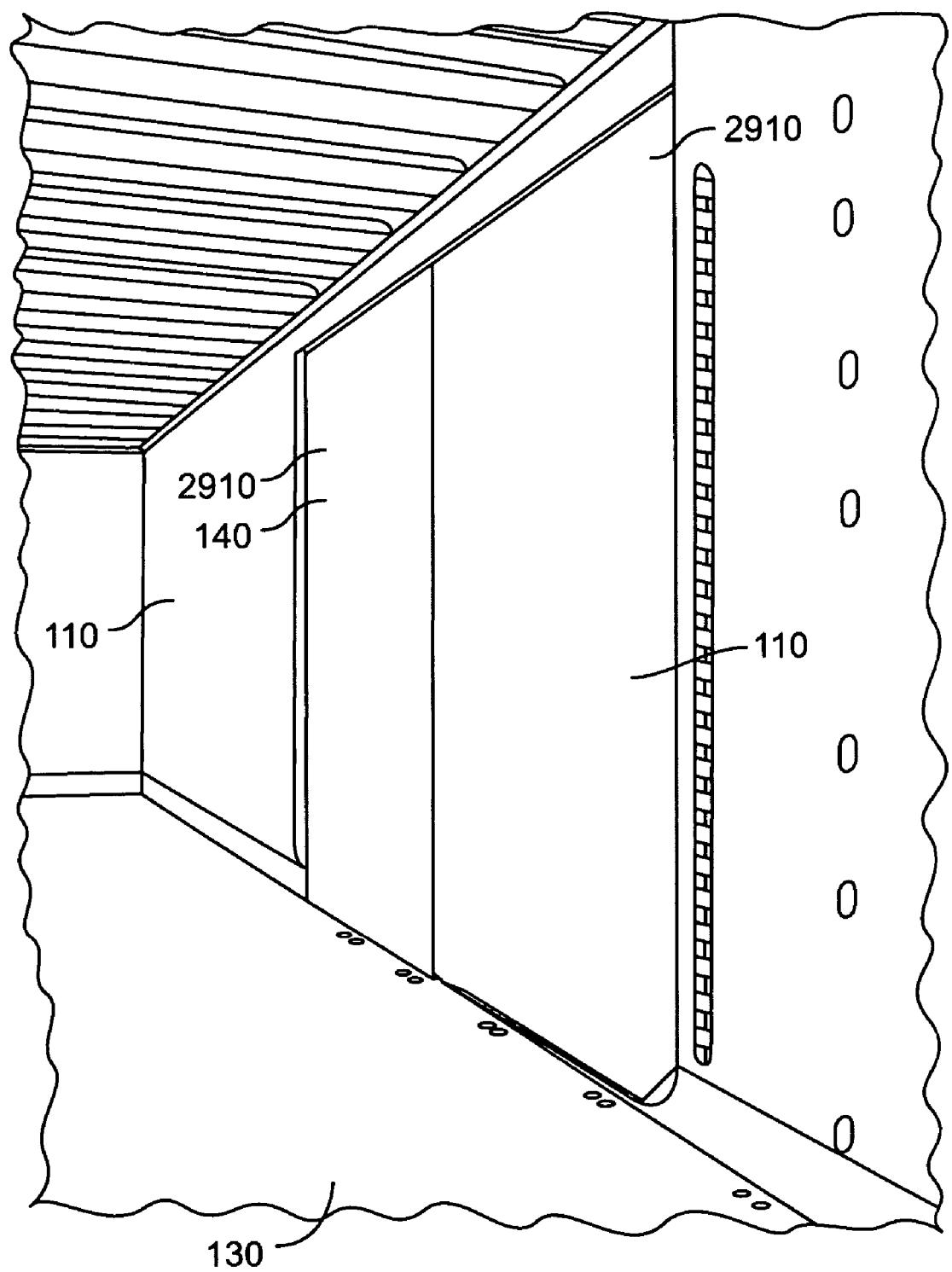
FIG. 30 is another schematic view of a portion of a boxcar with insulated panels installed on the boxcar doors consistent with one embodiment of the invention.

FIGS. 29 and 30 are multiple schematic views of a portion of a boxcar with insulated panels installed on the boxcar doors consistent with one embodiment of the invention. As shown in FIGS. 28, 29 and 30, doors 2810 and 2820 include door panels 2910 and 2920 on their interior surfaces. In this implementation, door panels 2910 and 2920 are insulated panels constructed of an outer skin on at least one face of an insulating layer. In one implementation, the outer skin and insulating layer may be constructed of any of the materials and in the same manner as the outer skin and insulating layer of the side panels, end panels, or roof panels discussed above. These implementations are merely exemplary, and other implementations may also be used.

Door panels 2910 and 2920 are constructed in a shape such that they may be overlaid on the interior surface of doors 2810 and 2820. In one implementation, door panels 2910 and 2920 are adhered to doors 2810 and 2820 using a structural adhesive. In another implementation, mechanical fasteners may also be used. Door panels 2910 and 2920 may be constructed from any of several well-known methods. These implementations are merely exemplary, and other implementations may also be used.

In one implementation, in order to improve the insulation of boxcar 100 when doors 2810 and 2820 are closed, a center door seal is also installed on one of doors 280 and 2820. The center door seal is a resilient sealing member formed of a material that is an effective thermal insulator. The center door seal is located on the interior surface of door 2820 and 2820, such that when the doors are in the closed configuration, the only contact between the doors and the door opening in the boxcar is between the perimeter of the opening and the center door seal or the thermally insulating panels. These implementations are merely exemplary, and other implementations may also be used.

Figure 31:
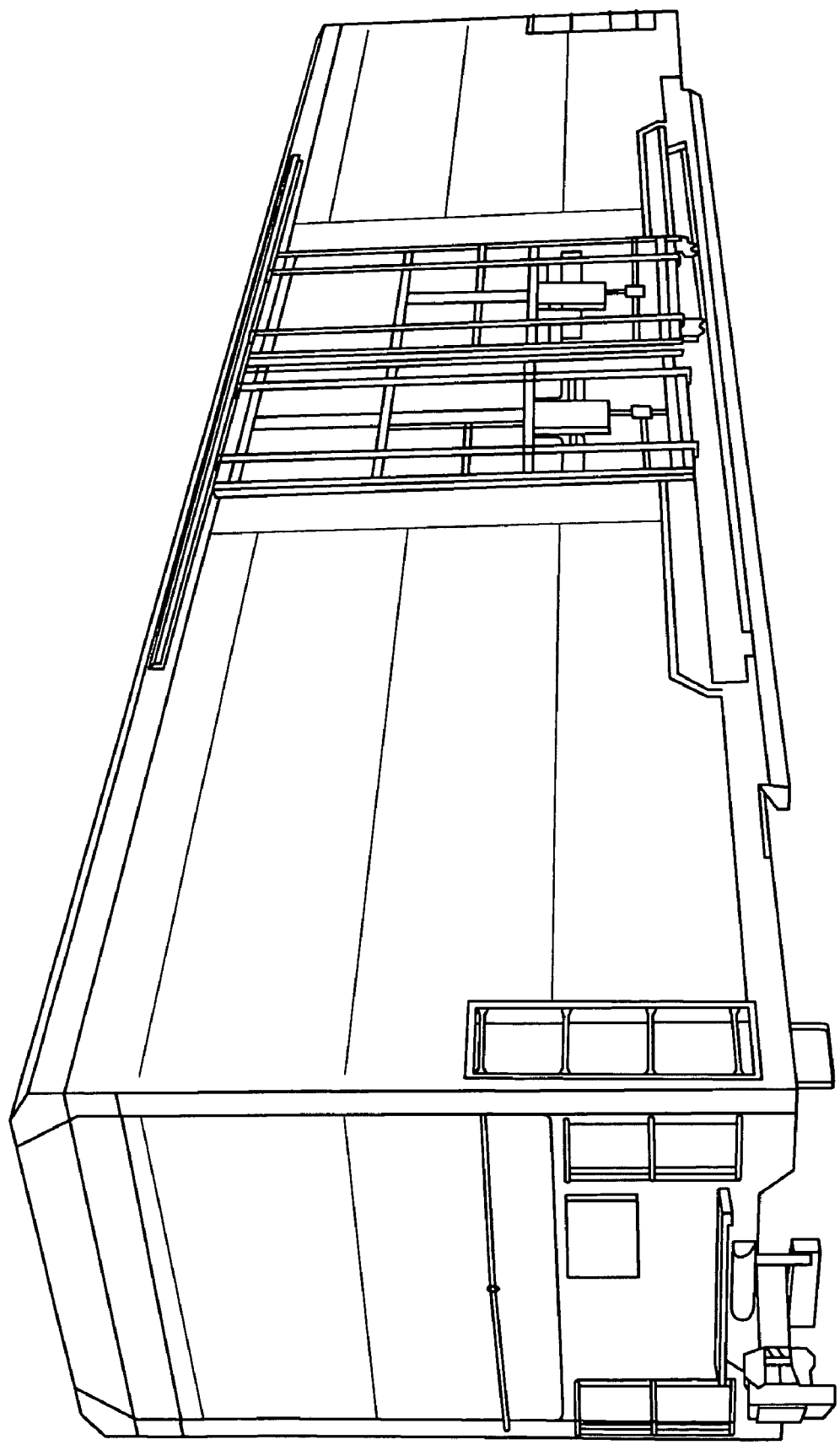
FIG. 31 is a perspective view of an insulated boxcar insulated consistent with one embodiment of the invention.

As shown in FIG. 2, in one implementation, the final step of the method of the invention is to paint and finish the boxcar (step 242). This step includes painting and finishing the exterior surfaces of the boxcar to provide a desired final appearance. FIG. 31 is a perspective view of an insulated boxcar insulated consistent with one embodiment of the invention. As shown in FIG. 31, boxcar 100 includes side panels 3100, roof closures, 3110, end panels 3120, end panel closures 3130, floor closures 3140 insulated doors 3150, and roof panels 3160, as described above.

It should be understood that application of the method described above, will improve the thermal efficency of boxcar 100. In one implementation, construction of a boxcar according to the implementations described above will result in a boxcar with an R-Value of at least 18. In another implementation, construction of a boxcar according to the implementations described above will result in a boxcar with an R-Value of at least 25. In still another implementation, construction of a boxcar according to the implementations described above will result in a boxcar with an R-Value of at least 30. In yet another implementation, construction of a boxcar according to the implementations described above will result in a boxcar with an R-Value of at least 33.

It should also be understood that application of the method described above, will result in the reduction of thermal shorts in boxcar 100. In one implementation, construction of a boxcar according to the implementations described above will result in a boxcar with less than 10% of the square footage of the boxcar comprising thermal shorts. In another implementation, construction of a boxcar according to the implementations described above will result in a boxcar with less than 5% of the square footage of the boxcar comprising thermal shorts. In yet another implementation, construction of a boxcar according to the implementations described above will result in a boxcar with less than 3% of the square footage of the boxcar comprising thermal shorts. It should also be understood that the increase in these insulating properties has been achieved without having to construct an entirely new boxcar. As indicated above, the method of the invention may be applied to other cargo containers, besides boxcars. In addition, while the method described above indicated one implementation of the order of the steps to be performed, the steps may be performed in any suitable order. For example, end panels roof panels, and side panels may be constructed and applied in any order.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of insulating an existing cargo container, wherein the existing cargo container comprises an underframe having a top and bottom surface; a floor connected to the top surface of the underframe; first and second side walls having exterior surfaces; first and second end walls having exterior surfaces, and a roof having an exterior surface, the underframe, floor, first and second side walls; first and second end walls, and roof being connected to form an enclosure, the method comprising:
    preparing at least one insulating panel comprising an insulating layer and at least one outer skin located on at least one face of the insulating layer;
    attaching at least one insulating panel on an exterior surface of the first side wall, wherein the at least one insulating panel substantially covers the exterior surface of the first side wall;
    attaching at least one insulating panel on an exterior surface of the second side wall, wherein the at least one insulating panel substantially covers the exterior surface of the second side wall;
    attaching at least one insulating panel on an exterior surface of the first end wall, wherein the at least one insulating panel substantially covers the exterior surface of the first end wall;
    attaching at least one insulating panel on an exterior surface of the second end wall, wherein the at least one insulating panel substantially covers the exterior surface of the second end wall;
    attaching at least one insulating panel on an exterior surface of the roof, wherein the at least one insulating panel substantially covers the exterior surface of the roof;
    installing at least one closure on the boxcar to cover a portion of an exterior surface of the existing cargo container not covered by an insulating panel; and
    applying foam insulation to the bottom surface of the underframe.

2. The method of claim 1, wherein the at least one outer skin of the at least one insulating panel comprises fiber-reinforced plastics and wherein the insulating layer comprises urethane foam.

3. The method of claim 1, wherein the at least one outer skin of the at least one insulating panel comprises metal and wherein the insulating layer comprises urethane foam.

4. The method of claim 1, wherein the at least one outer skin of the at least one insulating panel comprises fiber-reinforced plastics and wherein the insulating layer comprises a vacuum insulated panel.

5. The method of claim 1, wherein the at least one outer skin of the at least one insulating panel comprises metal and wherein the insulating layer comprises a vacuum insulated panel.

6. The method of claim 1, further comprising:
    removing the floor;
    attaching at least one insulating member to the top surface of the underframe; and
    attaching at least one floor panel to the at least one insulating member to form a floor of the existing cargo container.

7. The method of claim 6, wherein the at least one insulating member is constructed by pultrusion from fiber-reinforced plastics.

8. The method of claim 6, wherein attaching at least one floor panel comprises attaching the at least one floor panel to the at least one insulating member such that the floor panel does not contact the underframe.

9. The method of claim 1, wherein attaching at least one insulating panel on an exterior surface of the first side wall, second side wall, first end wall, second end wall, and roof, comprises:
   applying an adhesive to a surface of the at least one insulating panel to attach the insulating panels to the exterior surface of the first side wall, second side wall, first end wall, second end wall, and roof; and
   mechanically fastening the at least one insulating panel to the exterior surface of the of the first side wall, second side wall, first end wall, second end wall, and roof.

10. The method of claim 9, wherein applying an adhesive further comprises applying glass beads in the adhesive to achieve a uniform bondline thickness.

11. The method of claim 1, wherein attaching at least one insulating panel on an exterior surface of the roof results in spaces between the exterior surface of the roof and the insulating panel, and further comprising application of foam insulation in the space between the exterior surface of the roof and the insulating panel.

12. The method of claim 1, wherein installing at least one closure further comprises attaching the closure to at least one of the insulating panels.

13. The method of claim 1, wherein installing at least one closure further comprises installing the closures to cover any exterior surfaces of the first side wall, second side wall, first end wall, second end wall, or roof not covered by a insulating panel.

14. The method of claim 1, wherein the foam insulation applied to the bottom surface of the underframe is urethane foam.

15. A method of insulating an existing cargo container, wherein the existing cargo container comprises an underframe having a top and bottom surface; a floor connected to the top surface of the underframe; first and second side walls having exterior surfaces; first and second end walls having exterior surfaces, and a roof having an exterior surface, the underframe, floor, first and second side walls; first and second end walls, and roof being connected to form an enclosure, and a door providing access to the enclosure comprising:
   preparing at least one insulating panel comprising an insulating layer and at least one outer skin located on at least one face of the insulating layer;
   attaching at least one insulating panel on an exterior surface of the first side wall, wherein the at least one insulating panel substantially covers the exterior surface of the first side wall;
   attaching at least one insulating panel on an exterior surface of the second side wall, wherein the at least one insulating panel substantially covers the exterior surface of the second side wall;
   attaching at least one insulating panel on an exterior surface of the first end wall, wherein the at least one insulating panel substantially covers the exterior surface of the first end wall;
   attaching at least one insulating panel on an exterior surface of the second end wall, wherein the at least one insulating panel substantially covers the exterior surface of the second end wall;
   attaching at least one insulating panel on an exterior surface of the roof, wherein the at least one insulating panel substantially covers the exterior surface of the roof;
   attaching at least one insulating panel on an interior surface of the door, wherein the at least one insulating panel substantially covers the interior surface of the door;
   installing at least one closure on the boxcar to cover a portion of an exterior surface of the existing cargo container not covered by a insulating panel; and
   applying foam insulation to the bottom surface of the underframe.

16. The method of claim 15, wherein the at least one outer skin of the at least one insulating panel comprises fiber-reinforced plastics and wherein the insulating layer comprises urethane foam.

17. The method of claim 16, wherein the at least one outer skin of the at least one insulating panel comprises metal and wherein the insulating layer comprises urethane foam.

18. The method of claim 15, wherein installing at least one closure further comprises installing the closures to cover any exterior surfaces of the first side wall, second side wall, first end wall, second end wall, or roof not covered by a insulating panel.

19. A method of insulating an existing cargo container, wherein the existing cargo container comprises an underframe having a top and bottom surface; a floor connected to the top surface of the underframe; first and second side walls having exterior surfaces; first and second end walls having exterior surfaces, and a roof having an exterior surface, the underframe, floor, first and second side walls; first and second end walls, and roof being connected to form an enclosure, and a door providing access to the enclosure comprising:
   preparing at least one insulating panel comprising an insulating layer and at least one outer skin located on at least one face of the insulating layer;
   attaching at least one insulating panel on an exterior surface of the first side wall, wherein the at least one insulating panel substantially covers the exterior surface of the first side wall;
   attaching at least one insulating panel on an exterior surface of the second side wall, wherein the at least one insulating panel substantially covers the exterior surface of the second side wall;
   attaching at least one insulating panel on an exterior surface of the first end wall, wherein the at least one insulating panel substantially covers the exterior surface of the first end wall;
   attaching at least one insulating panel on an exterior surface of the second end wall, wherein the at least one insulating panel substantially covers the exterior surface of the second end wall;
   attaching at least one insulating panel on an exterior surface of the roof, wherein the at least one insulating panel substantially covers the exterior surface of the roof;
   attaching at least one insulating panel on an interior surface of the door, wherein the at least one insulating panel substantially covers the interior surface of the door;
   installing the at least one closure on the boxcar to cover a portion of an exterior surface of the existing cargo container not covered by a insulating panel;
   removing the floor;
   attaching at least one insulating member to the top surface of the underframe; and
   attaching at least one floor panel on the insulating members to form a floor of the existing cargo container; and
   applying foam insulation to the bottom surface of the underframe.

* * * * *